(12) United States Patent
Kumar et al.

(10) Patent No.: US 12,609,778 B2
(45) Date of Patent: Apr. 21, 2026

(54) MODEL UPDATE TECHNIQUES IN WIRELESS COMMUNICATIONS

(71) Applicant: QUALCOMM Incorporated, San Diego, CA (US)

(72) Inventors: Rajeev Kumar, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 18/446,334

(22) Filed: Aug. 8, 2023

(65) Prior Publication Data

US 2024/0154710 A1 May 9, 2024

Related U.S. Application Data

(60) Provisional application No. 63/382,176, filed on Nov. 3, 2022.

(51) Int. Cl.
H04B 17/391 (2015.01)

(52) U.S. Cl.
CPC ..... H04B 17/3913 (2015.01); H04B 17/3912 (2015.01)

(58) Field of Classification Search
CPC ..................... H04B 17/3913; H04B 17/3912
See application file for complete search history.

(56) References Cited

U.S. PATENT DOCUMENTS

| | | | |
|---|---|---|---|
| 2018/0270126 A1 | 9/2018 | Tapia | |
| 2021/0344745 A1* | 11/2021 | Mermoud | H04L 41/16 |
| 2023/0006913 A1* | 1/2023 | Lo | H04L 41/0853 |

FOREIGN PATENT DOCUMENTS

WO       WO-2022178706 A1       9/2022

OTHER PUBLICATIONS

Apple Inc: "Other Aspects on AI/ML for Beam Management" 3GPP TSG-RAN WG1 Meeting #110bis-e, R1-2209579, 3rd Generation Partnership Project, Mobile Competence Centre, 650, Route Des Lucioles, F-06921 Sophia-Antipolis Cedex, France, vol. RAN WG1, No. e-Meeting; Oct. 10, 2022-Oct. 19, 2022, Sep. 30, 2022, 10 Pages, XP052259052.

(Continued)

*Primary Examiner* — Natasha W Cosme
(74) *Attorney, Agent, or Firm* — Holland & Hart LLP

(57) ABSTRACT

Methods, systems, and devices for wireless communications are described that provide for machine learning model generalization in which a machine learning model may be initially configured for a first set of conditions, and the machine learning model may be generalized to apply to one or more conditions that are outside of the first set of conditions. A network entity may provide a user equipment (UE) with one or more machine learning models, the first set of conditions, and information for model evaluation in which one or more key performance indicators (KPIs) may be evaluated for conditions outside of the first set of conditions. The UE may measure the KPIs, and transmit an evaluation report to the network entity that indicates the KPIs for the identified condition. The network entity may generalize the corresponding model based on the reported KPIs, and provide an updated machine learning model.

30 Claims, 23 Drawing Sheets

(56) References Cited

OTHER PUBLICATIONS

Ericsson: "Evaluation of AI/ML for Positioning Accuracy Enhancement", 3GPP TSG-RAN WG1 Meeting #110, Tdoc R1-2206248, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 13, 2022, 27 Pages XP052274181.
International Search Report and Written Opinion—PCT/US2023/036109—ISA/EPO—Feb. 14, 2024.

* cited by examiner

Model Configuration Manager

1025

KPI Measurement Manager

1030

Evaluation Report Manager

1035

Condition Identification Manager

1040

1020

1000

1210        1220        1215

1205

1200

130

105

115

Network
Entity

Transceiver

1510

Antenna

1515

Communications
Manager

1520

Memory

Code

1530

1525

1540

Processor

1535

1505

1500

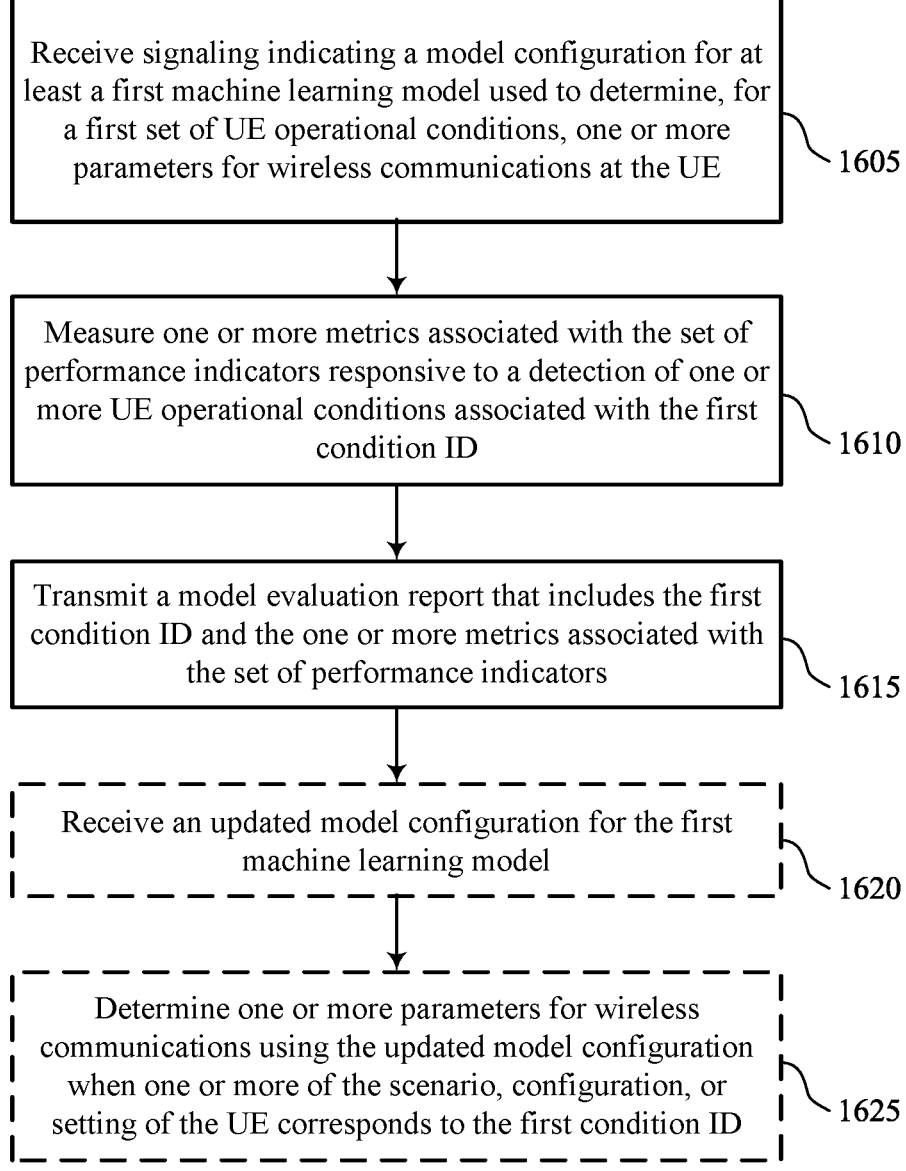

Receive signaling indicating a model configuration for at least a first machine learning model used to determine, for a first set of UE operational conditions, one or more parameters for wireless communications at the UE

1605

Measure one or more metrics associated with the set of performance indicators responsive to a detection of one or more UE operational conditions associated with the first condition ID

1610

Transmit a model evaluation report that includes the first condition ID and the one or more metrics associated with the set of performance indicators

1615

Receive an updated model configuration for the first machine learning model

1620

Determine one or more parameters for wireless communications using the updated model configuration when one or more of the scenario, configuration, or setting of the UE corresponds to the first condition ID

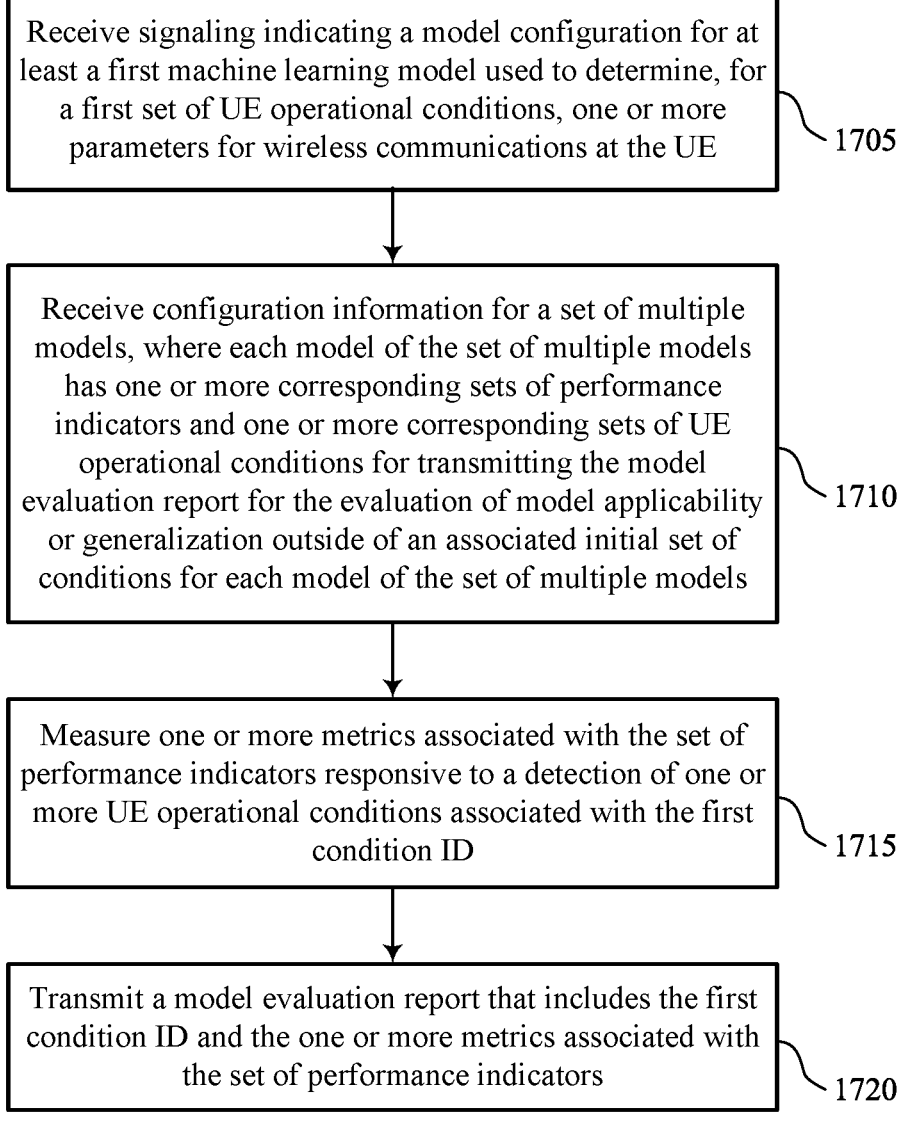

Receive signaling indicating a model configuration for at least a first machine learning model used to determine, for a first set of UE operational conditions, one or more parameters for wireless communications at the UE

1705

Receive configuration information for a set of multiple models, where each model of the set of multiple models has one or more corresponding sets of performance indicators and one or more corresponding sets of UE operational conditions for transmitting the model evaluation report for the evaluation of model applicability or generalization outside of an associated initial set of conditions for each model of the set of multiple models

1710

Measure one or more metrics associated with the set of performance indicators responsive to a detection of one or more UE operational conditions associated with the first condition ID

1715

Transmit a model evaluation report that includes the first condition ID and the one or more metrics associated with the set of performance indicators

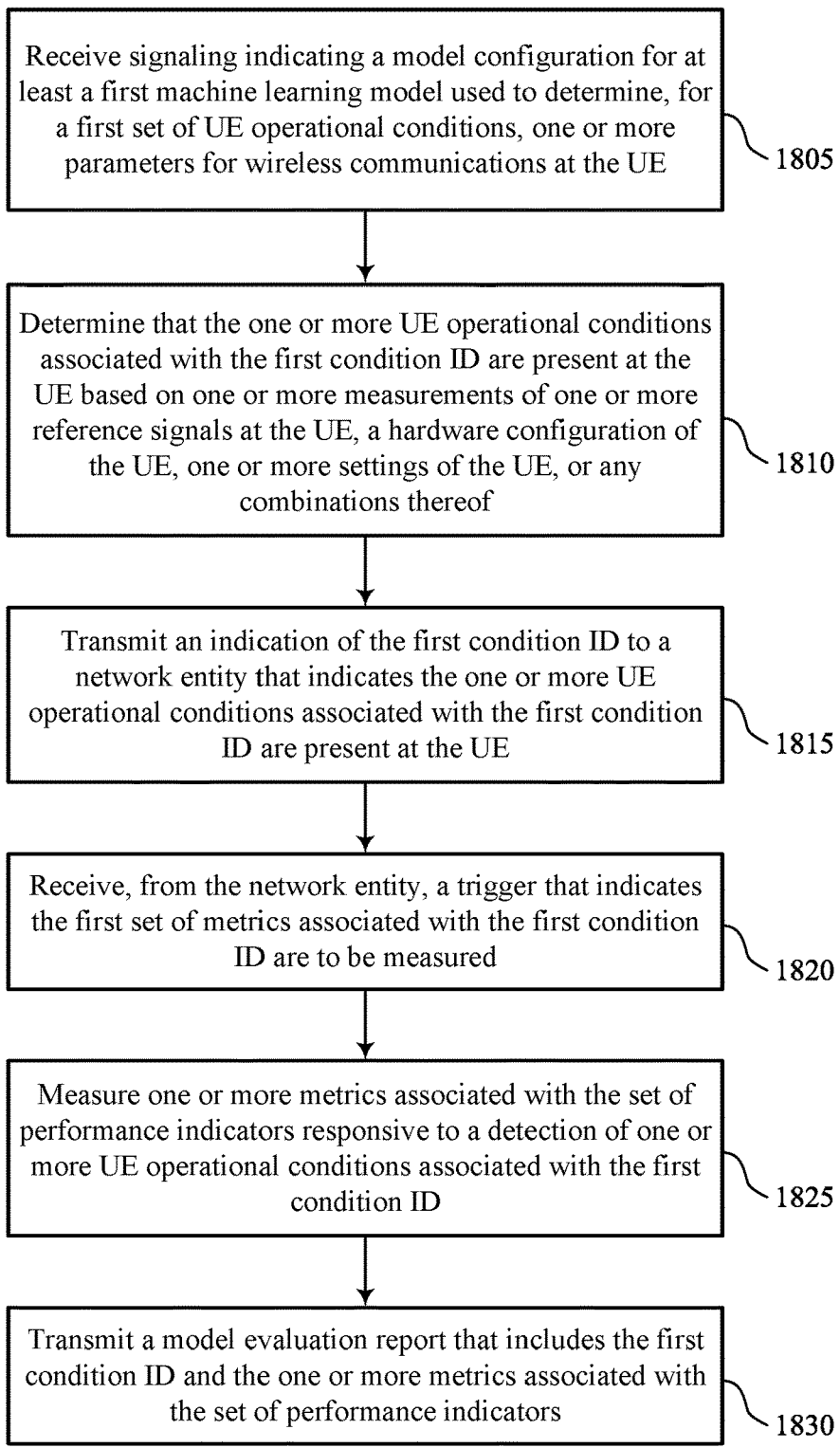

Receive signaling indicating a model configuration for at least a first machine learning model used to determine, for a first set of UE operational conditions, one or more parameters for wireless communications at the UE

1805

Determine that the one or more UE operational conditions associated with the first condition ID are present at the UE based on one or more measurements of one or more reference signals at the UE, a hardware configuration of the UE, one or more settings of the UE, or any combinations thereof

1810

Transmit an indication of the first condition ID to a network entity that indicates the one or more UE operational conditions associated with the first condition ID are present at the UE

1815

Receive, from the network entity, a trigger that indicates the first set of metrics associated with the first condition ID are to be measured

1820

Measure one or more metrics associated with the set of performance indicators responsive to a detection of one or more UE operational conditions associated with the first condition ID

1825

Transmit a model evaluation report that includes the first condition ID and the one or more metrics associated with the set of performance indicators

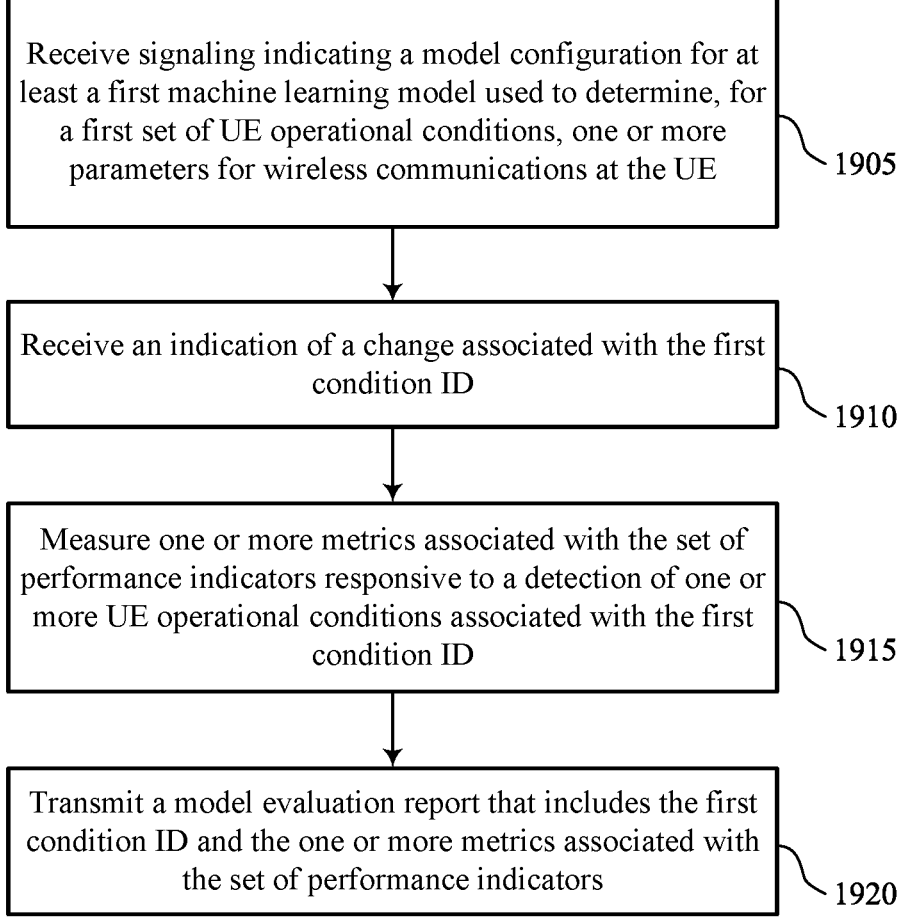

Receive signaling indicating a model configuration for at least a first machine learning model used to determine, for a first set of UE operational conditions, one or more parameters for wireless communications at the UE

1905

Receive an indication of a change associated with the first condition ID

1910

Measure one or more metrics associated with the set of performance indicators responsive to a detection of one or more UE operational conditions associated with the first condition ID

1915

Transmit a model evaluation report that includes the first condition ID and the one or more metrics associated with the set of performance indicators

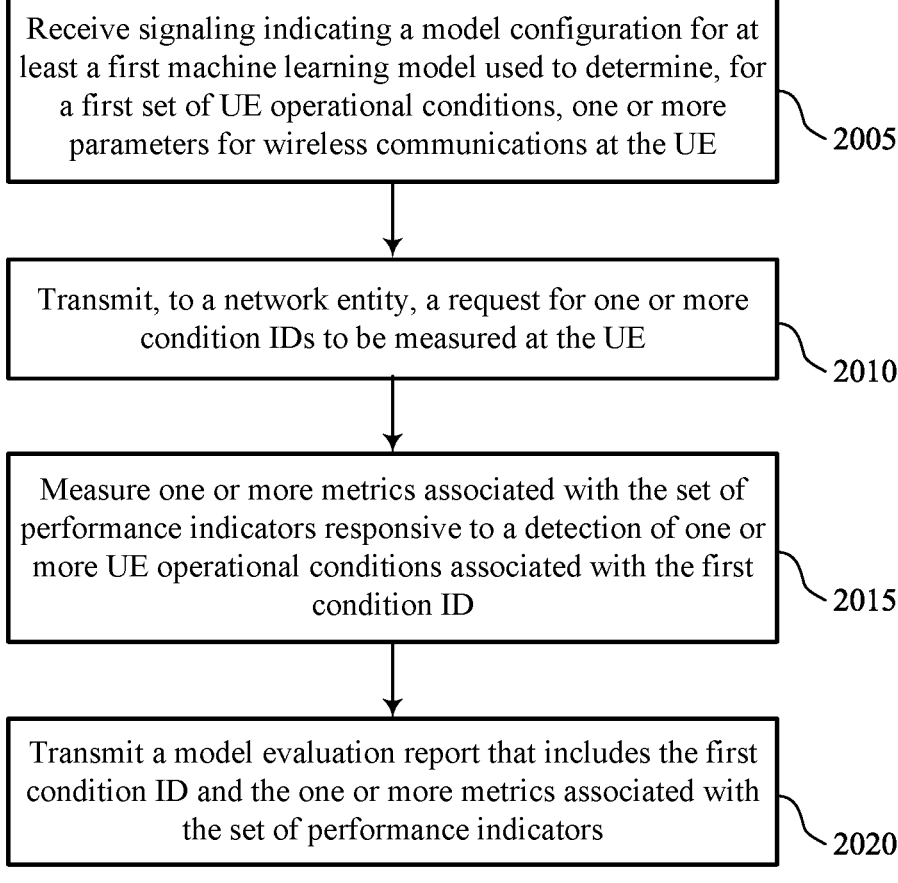

Receive signaling indicating a model configuration for at least a first machine learning model used to determine, for a first set of UE operational conditions, one or more parameters for wireless communications at the UE

2005

Transmit, to a network entity, a request for one or more condition IDs to be measured at the UE

2010

Measure one or more metrics associated with the set of performance indicators responsive to a detection of one or more UE operational conditions associated with the first condition ID

2015

Transmit a model evaluation report that includes the first condition ID and the one or more metrics associated with the set of performance indicators

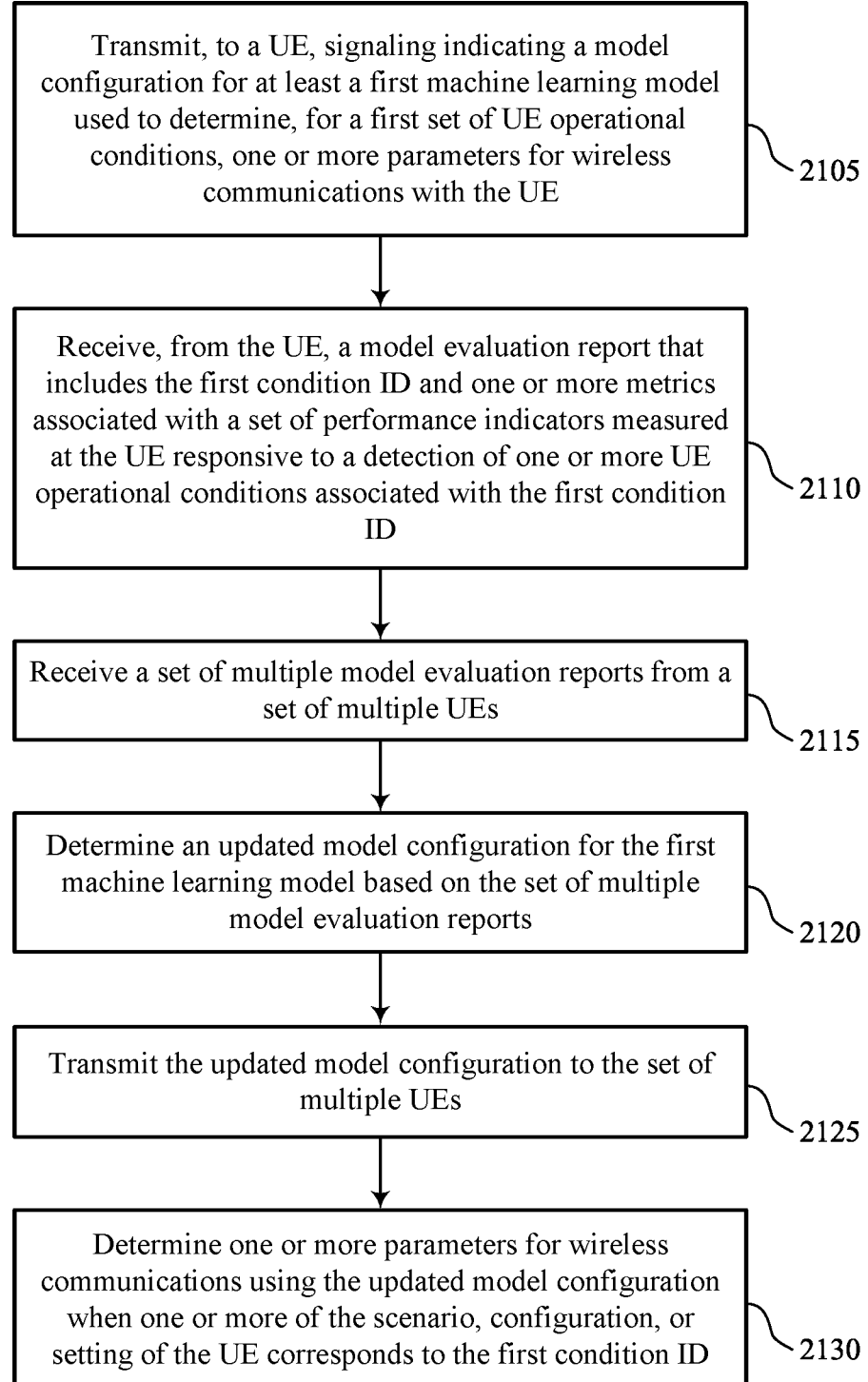

Transmit, to a UE, signaling indicating a model configuration for at least a first machine learning model used to determine, for a first set of UE operational conditions, one or more parameters for wireless communications with the UE

2105

Receive, from the UE, a model evaluation report that includes the first condition ID and one or more metrics associated with a set of performance indicators measured at the UE responsive to a detection of one or more UE operational conditions associated with the first condition ID

2110

Receive a set of multiple model evaluation reports from a set of multiple UEs

2115

Determine an updated model configuration for the first machine learning model based on the set of multiple model evaluation reports

2120

Transmit the updated model configuration to the set of multiple UEs

2125

Determine one or more parameters for wireless communications using the updated model configuration when one or more of the scenario, configuration, or setting of the UE corresponds to the first condition ID

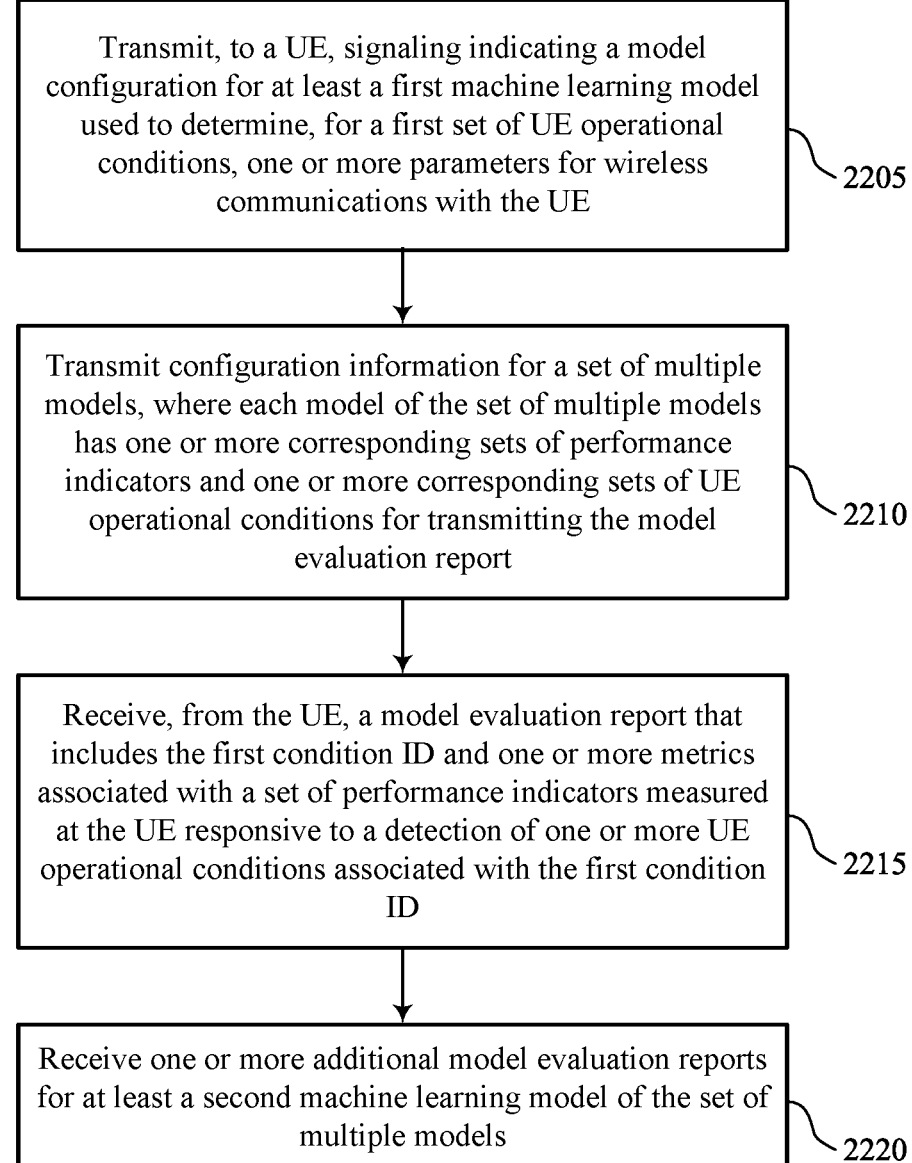

Transmit, to a UE, signaling indicating a model configuration for at least a first machine learning model used to determine, for a first set of UE operational conditions, one or more parameters for wireless communications with the UE

2205

Transmit configuration information for a set of multiple models, where each model of the set of multiple models has one or more corresponding sets of performance indicators and one or more corresponding sets of UE operational conditions for transmitting the model evaluation report

2210

Receive, from the UE, a model evaluation report that includes the first condition ID and one or more metrics associated with a set of performance indicators measured at the UE responsive to a detection of one or more UE operational conditions associated with the first condition ID

2215

Receive one or more additional model evaluation reports for at least a second machine learning model of the set of multiple models

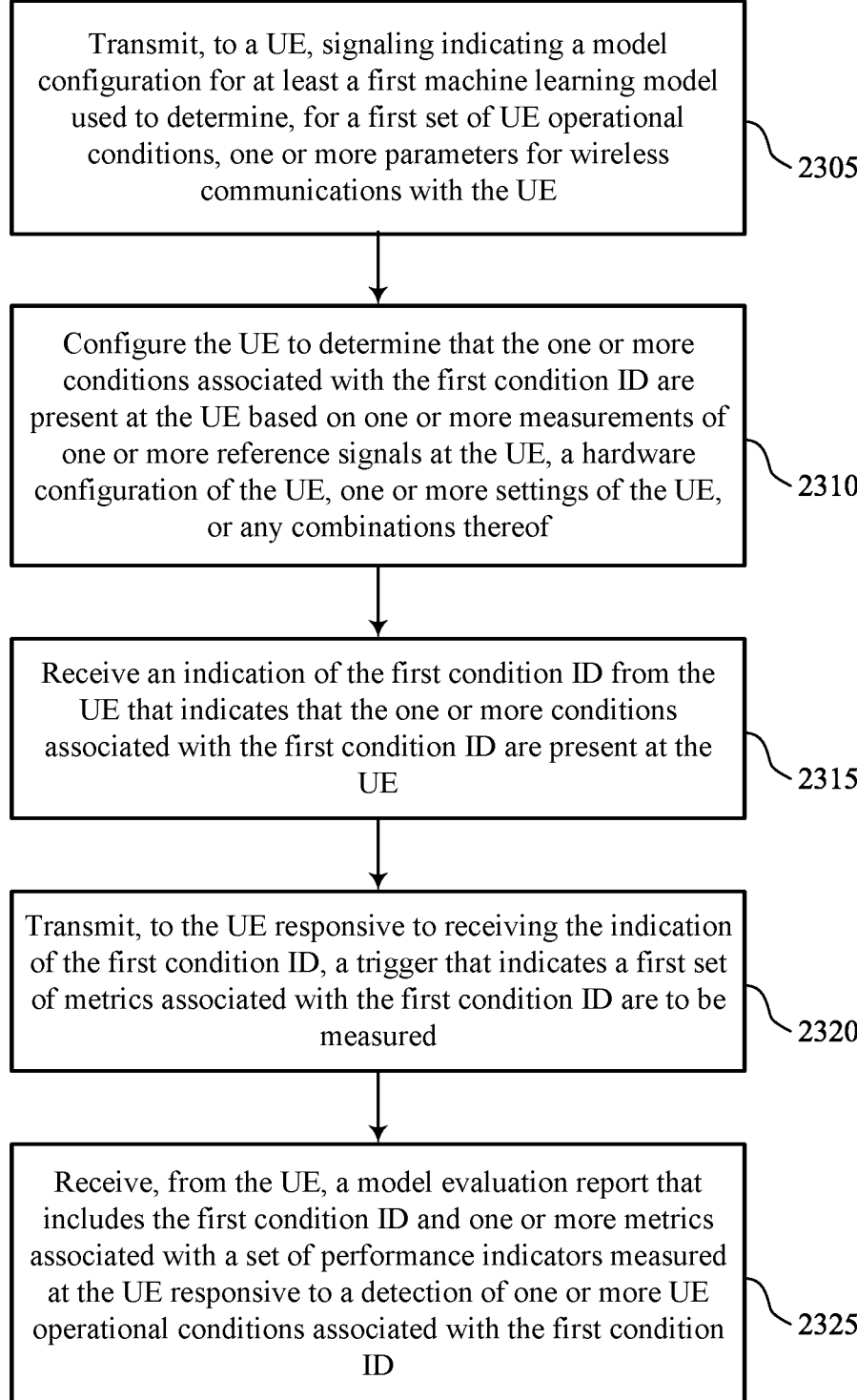

Transmit, to a UE, signaling indicating a model configuration for at least a first machine learning model used to determine, for a first set of UE operational conditions, one or more parameters for wireless communications with the UE

2305

Configure the UE to determine that the one or more conditions associated with the first condition ID are present at the UE based on one or more measurements of one or more reference signals at the UE, a hardware configuration of the UE, one or more settings of the UE, or any combinations thereof

2310

Receive an indication of the first condition ID from the UE that indicates that the one or more conditions associated with the first condition ID are present at the UE

2315

Transmit, to the UE responsive to receiving the indication of the first condition ID, a trigger that indicates a first set of metrics associated with the first condition ID are to be measured

2320

Receive, from the UE, a model evaluation report that includes the first condition ID and one or more metrics associated with a set of performance indicators measured at the UE responsive to a detection of one or more UE operational conditions associated with the first condition ID

MODEL UPDATE TECHNIQUES IN WIRELESS COMMUNICATIONS

CROSS REFERENCE

The present application for patent claims the benefit of U.S. Provisional Patent Application No. 63/382,176 by KUMAR et al., entitled "MODEL UPDATE TECHNIQUES IN WIRELESS COMMUNICATIONS," filed Nov. 3, 2022, assigned to the assignee hereof, and expressly incorporated by reference herein.

FIELD OF TECHNOLOGY

The following relates to wireless communications, including model update techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, UEs and network entities may use one or more machine learning models to make predictions and determine various communications parameters based on learned data and current conditions for wireless communications. In some cases, machine learning models may be used based on particular conditions or scenarios for communications. For example, different machine learning models may be provided for indoor versus outdoor settings, which may be used to provide beamforming parameters, antenna configuration parameters, transmit power parameters, or combinations thereof. As machine learning models are relied on in more aspects of wireless communications, efficient techniques for developing and updating such models are desirable to help enhance communications efficiency and reliability.

SUMMARY

The described techniques relate to improved methods, systems, devices, and apparatuses that support model update techniques in wireless communications. For example, the described techniques provide for machine learning model generalization in which a machine learning model may be initially configured for a first set of conditions (e.g., use case scenarios, user equipment (UE) configurations, UE or network settings), and the machine learning model may be generalized to apply to one or more conditions that are outside of the first set of conditions. In some aspects, a network entity may provide a UE with one or more machine learning models, and the first set of conditions. Further, the network entity may provide configuration information for model evaluation, in which one or more key performance indicators (KPIs) may be evaluated for conditions outside of the first set of conditions, for use in model generalization. The UE may identify a change in conditions associated with the model generalization, may measure the one or more the KPIs, and transmit an evaluation report to the network entity that indicates the KPIs for the identified condition. In some cases, the evaluation report may indicate a model identification (ID) and a condition ID, such that the reported KPIs may be linked to the particular model and condition for model generalization. The network entity may update the corresponding machine learning model (e.g., based on an aggregation of evaluation reports from multiple UEs) based on the reported KPIs. An updated model configuration may then be provided to UEs for use in subsequent communications.

A method for wireless communication by a user equipment (UE) is described. The method may include receiving signaling indicating a model configuration for at least a first machine learning model used to determine, for a first set of UE operational conditions, one or more parameters for wireless communications at the UE, where the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions, measuring one or more metrics associated with the set of performance indicators responsive to a detection of one or more UE operational conditions associated with the first condition ID, and transmitting a model evaluation report that includes the first condition ID and the one or more metrics associated with the set of performance indicators.

A UE for wireless communication is described. The UE may include one or more memories storing processor-executable code, and one or more processors coupled with the one or more memories. The one or more processors are individually or collectively operable to execute the code to cause the UE to receive signaling indicating a model configuration for at least a first machine learning model used to determine, for a first set of UE operational conditions, one or more parameters for wireless communications at the UE, where the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions, measure one or more metrics associated with the set of performance indicators responsive to a detection of one or more UE operational conditions associated with the first condition ID, and transmit a model evaluation report that includes the first condition ID and the one or more metrics associated with the set of performance indicators.

Another UE for wireless communication is described. The UE may include means for receiving signaling indicating a model configuration for at least a first machine learning model used to determine, for a first set of UE operational conditions, one or more parameters for wireless communications at the UE, where the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions, means for measuring one or more metrics associated with the set of performance indicators responsive to a detection of one or more UE operational conditions associated with the first condition ID, and means for transmitting a model evaluation report that includes the first condition ID and the one or more metrics associated with the set of performance indicators.

A non-transitory computer-readable medium storing code for wireless communication at a UE is described. The code may include instructions executable by one or more processors to receive signaling indicating a model configuration for at least a first machine learning model used to determine, for a first set of UE operational conditions, one or more parameters for wireless communications at the UE, where the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions, measure one or more metrics associated with the set of performance indicators responsive to a detection of one or more UE operational conditions associated with the first condition ID, and transmit a model evaluation report that includes the first condition ID and the one or more metrics associated with the set of performance indicators.

In some examples of the method, UEs, and non-transitory computer-readable medium described herein, the receiving the model configuration may include operations, features, means, or instructions for receiving configuration information for a set of multiple models, where each model of the set of multiple models has one or more corresponding sets of performance indicators and one or more corresponding sets of UE operational conditions for transmitting the model evaluation report for the evaluation of model applicability or generalization outside of an associated initial set of conditions for each model of the set of multiple models. Some examples of the method, UEs, and non-transitory computer-readable medium described herein may further include operations, features, means, or instructions for transmitting one or more additional model evaluation reports for at least a second machine learning model of the set of multiple models.

Some examples of the method, UEs, and non-transitory computer-readable medium described herein may further include operations, features, means, or instructions for determining that the one or more UE operational conditions associated with the first condition ID is present at the UE based on one or more measurements of one or more reference signals at the UE, a hardware configuration of the UE, one or more settings of the UE, or any combinations thereof, where the measuring includes measuring a first set of metrics associated with the first condition ID.

Some examples of the method, UEs, and non-transitory computer-readable medium described herein may further include operations, features, means, or instructions for transmitting an indication of the first condition ID to a network entity that indicates the one or more UE operational conditions associated with the first condition ID are present at the UE. Some examples of the method, UEs, and non-transitory computer-readable medium described herein may further include operations, features, means, or instructions for receiving, from the network entity, a trigger that indicates the first set of metrics associated with the first condition ID is to be measured.

Some examples of the method, UEs, and non-transitory computer-readable medium described herein may further include operations, features, means, or instructions for determining one or more parameters for wireless communications based on second condition of the first set of UE operational conditions and the first machine learning model and communicating with a network entity based on the one or more parameters. Some examples of the method, UEs, and non-transitory computer-readable medium described herein may further include operations, features, means, or instructions for receiving an indication of a change associated with the first condition ID, where the measuring and the transmitting are performed responsive to the indication of the change associated with the first condition ID.

Some examples of the method, UEs, and non-transitory computer-readable medium described herein may further include operations, features, means, or instructions for transmitting, to a network entity, a request for one or more condition IDs to be measured at the UE, where the receiving the model configuration is responsive to the request. In some examples of the method, UEs, and non-transitory computer-readable medium described herein, the request indicates one or more of a start time or a stop time for one or more associated condition IDs. In some examples of the method, UEs, and non-transitory computer-readable medium described herein, the model evaluation report includes one or more model IDs, one or more condition IDs associated with each of the one or more model IDs, and one or more metrics associated with the set of performance indicators of each reported condition ID.

Some examples of the method, UEs, and non-transitory computer-readable medium described herein may further include operations, features, means, or instructions for receiving an updated model configuration for the first machine learning model, where the updated model configuration is based on the model evaluation report and one or more other model evaluation reports provided by one or more other UEs and where the updated model configuration for the first machine learning model provides an updated first set of UE operational conditions and determining one or more parameters for wireless communications using the updated model configuration when one or more of the scenario, configuration, or setting of the UE corresponds to the first condition ID.

A method for wireless communication by a network entity is described. The method may include transmitting, to a UE, signaling indicating a model configuration for at least a first machine learning model used to determine, for a first set of UE operational conditions, one or more parameters for wireless communications with the UE, where the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions and receiving, from the UE, a model evaluation report that includes the first condition ID and one or more metrics associated with a set of performance indicators measured at the UE responsive to a detection of one or more UE operational conditions associated with the first condition ID.

A network entity for wireless communication is described. The network entity may include one or more memories storing processor-executable code, and one or more processors coupled with the one or more memories. The one or more processors are individually or collectively operable to execute the code to cause the network entity to transmit, to a UE, signaling indicating a model configuration for at least a first machine learning model used to determine, for a first set of UE operational conditions, one or more parameters for wireless communications with the UE, where the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions and receive, from the UE, a model evaluation report that includes the first condition ID and one or more metrics associated with a set of performance indicators measured at the UE responsive to a detection of one or more UE operational conditions associated with the first condition ID.

Another network entity for wireless communication is described. The network entity may include means for transmitting, to a UE, signaling indicating a model configuration for at least a first machine learning model used to determine, for a first set of UE operational conditions, one or more parameters for wireless communications with the UE, where the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions and means for receiving, from the UE, a model evaluation report that includes the first condition ID and one or more metrics associated with a set of performance indicators measured at the UE responsive to a detection of one or more UE operational conditions associated with the first condition ID.

A non-transitory computer-readable medium storing code for wireless communication at a network entity is described. The code may include instructions executable by one or more processors to transmit, to a UE, signaling indicating a model configuration for at least a first machine learning model used to determine, for a first set of UE operational conditions, one or more parameters for wireless communications with the UE, where the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions and receive, from the UE, a model evaluation report that includes the first condition ID and one or more metrics associated with a set of performance indicators measured at the UE responsive to a detection of one or more UE operational conditions associated with the first condition ID.

In some examples of the method, network entities, and non-transitory computer-readable medium described herein, the transmitting the model configuration may include operations, features, means, or instructions for transmitting configuration information for a set of multiple models, where each model of the set of multiple models has one or more corresponding sets of performance indicators and one or more corresponding sets of UE operational conditions for transmitting the model evaluation report. Some examples of the method, network entities, and non-transitory computer-readable medium described herein may further include operations, features, means, or instructions for receiving one or more additional model evaluation reports for at least a second machine learning model of the set of multiple models.

Some examples of the method, network entities, and non-transitory computer-readable medium described herein may further include operations, features, means, or instructions for configuring the UE to determine that the one or more conditions associated with the first condition ID are present at the UE based on one or more measurements of one or more reference signals at the UE, a hardware configuration of the UE, one or more settings of the UE, or any combinations thereof.

Some examples of the method, network entities, and non-transitory computer-readable medium described herein may further include operations, features, means, or instructions for receiving an indication of the first condition ID from the UE that indicates that the one or more conditions associated with the first condition ID are present at the UE. Some examples of the method, network entities, and non-transitory computer-readable medium described herein may further include operations, features, means, or instructions for transmitting, to the UE responsive to receiving the indication of the first condition ID, a trigger that indicates a first set of metrics associated with the first condition ID are to be measured. Some examples of the method, network entities, and non-transitory computer-readable medium described herein may further include operations, features, means, or instructions for determining one or more parameters for wireless communications based on second condition of the first set of UE operational conditions and the first machine learning model and communicating with the UE based on the one or more parameters. Some examples of the method, network entities, and non-transitory computer-readable medium described herein may further include operations, features, means, or instructions for transmitting, to the UE, an indication of a change associated with the first condition ID, where the UE transmits the model evaluation report responsive to the indication of the change associated with the first condition ID.

Some examples of the method, network entities, and non-transitory computer-readable medium described herein may further include operations, features, means, or instructions for receiving, from the UE, a request for one or more condition IDs to be measured at the UE, where the model configuration is transmitted responsive to the request. In some examples of the method, network entities, and non-transitory computer-readable medium described herein, the request indicates one or more of a start time or a stop time for one or more associated condition IDs.

In some examples of the method, network entities, and non-transitory computer-readable medium described herein, the model evaluation report includes one or more model IDs, one or more condition IDs associated with each of the one or more model IDs, and one or more metrics associated with the set of performance indicators of each reported condition ID. Some examples of the method, network entities, and non-transitory computer-readable medium described herein may further include operations, features, means, or instructions for receiving a set of multiple model evaluation reports from a set of multiple UEs, determining an updated model configuration for the first machine learning model based on the set of multiple model evaluation reports, transmitting the updated model configuration to the set of multiple UEs, and determining one or more parameters for wireless communications using the updated model configuration when one or more of the scenario, configuration, or setting of the UE corresponds to the first condition ID.

BRIEF DESCRIPTION OF THE DRAWINGS

FIGS. 16 through 23 illustrate flowcharts showing methods that support model update techniques in wireless communications in accordance with one or more aspects of the present disclosure.

DETAILED DESCRIPTION

Figure 1:
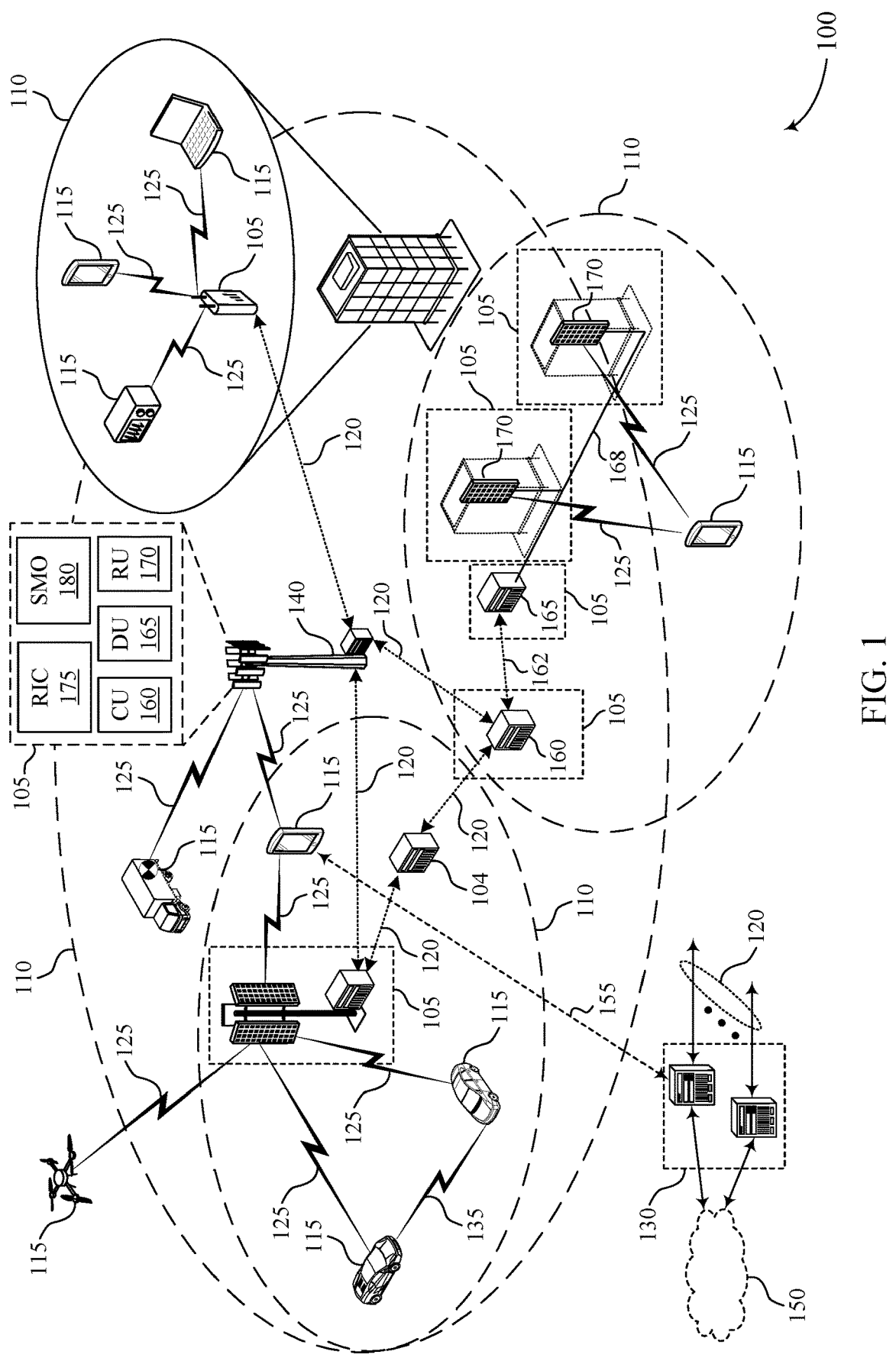
FIG. 1 illustrates an example of a wireless communications system that supports model update techniques in wireless communications in accordance with one or more aspects of the present disclosure.

Some artificial intelligence (AI) and machine learning models may use defined sets of input and output parameters, for example, when operating in a wireless communications system. In some examples, a network entity and a user equipment (UE) may use one or more machine learning models to make decisions for wireless communications, which may improve efficiency, latency, and reliability of the wireless communications. Some machine learning models may be trained using offline data, in which case the machine learning model may be trained using one or more sets of data that are stored for one or more conditions of a first set of conditions (e.g., one or more UE operational conditions of a first set of UE operational conditions). The first set of conditions may include, for example, different condition identifications (IDs) that are associated with different settings, scenarios, configurations, or any combinations thereof. For example, different condition IDs may be associated with indoor or outdoor settings, channel quality metrics in different ranges, and different active UE antenna configurations. The machine learning models may be verified using the same data or different data than was used to train the models, to confirm proper operations. Such machine learning model training may thus provide inferences for different conditions of the first set of conditions.

For example, the one or more machine learning models may use input data from the UE and the network entity, or input data just from the UE, to generate a machine learning inference. Machine learning inference may be a process of running live data points through a trained machine learning model and parameter set to calculate an output. Information about the one or more machine learning models, the one or more parameter sets, or both, including how a machine learning model and a corresponding parameter set is trained, a priority of each machine learning model, each parameter set, or both, and other information, may be provided to the network entity, determined by the network entity, or both. The network entity may transmit configuration information to the UE indicating the one or more machine learning models, the one or more parameter sets, or both, and one or more UE operational conditions the UE may use to select one of the machine learning models, one of the parameter sets, or both, to generate the machine learning inference based on input data.

In some cases, the UE may select a machine learning model, a parameter set, or both based on a particular UE operational condition being satisfied, a priority of the machine learning model and parameter set, and other factors. In some examples, the UE may switch the machine learning model, the parameter set, or both, the UE uses to generate the machine learning inference and transmit an indication of the model and/or parameter set switching to the network entity. In some examples, the UE may generate the machine learning inference using the selected machine learning model, the selected parameter set, or both, and the UE may transmit a report to the network entity, the report indicating the output of the inference, the machine learning model, the parameter set, or both selected to generate the interference, or both. However, when a UE or a network entity (e.g., a network node) operates in a condition in which a machine learning model has not been trained, determination of suitable communications parameters may take additional time and resources (e.g., due to additional measurements and reporting to determine communication parameters), and may result in system performance degradation relative to conditions on which a machine learning model can be used to determine communications parameters.

In accordance with various aspects, described techniques provide for machine learning model generalization in which a machine learning model may be initially configured for a first set of UE operational conditions (e.g., where different condition IDs are associated with different combinations of indoor or outdoor settings, UE antenna configurations, and channel conditions), and the machine learning model may be generalized to apply to one or more conditions that are outside of the first set of conditions. In some aspects, a network entity may provide one or more UEs with one or more machine learning models, and the first set of conditions. Further, the network entity may provide configuration information for model evaluation, in which one or more key performance indicators (KPIs) may be evaluated for conditions outside of the first set of conditions, for use in model generalization. The UE may identify a change in conditions associated with the model generalization, may measure the one or more the KPIs, and transmit an evaluation report to the network entity that indicates the KPIs for the identified condition. In some cases, the evaluation report may indicate a model ID and a condition ID, such that the reported KPIs may be linked to the particular model and UE operational condition for model generalization. The network entity may update the corresponding machine learning model (e.g., based on an aggregation of evaluation reports from multiple UEs) based on the reported KPIs. An updated model configuration may then be provided to UEs for use in subsequent communications.

Aspects of the subject matter described herein may be implemented to support improved machine learning operations in wireless communications. For example, the network entity may provide information related to one or more UE operational conditions that are outside of a configured set of UE operational conditions, for machine learning model generalization. A UE may measure one or more KPIs associated with the one or more UE operational conditions, which may provide data that can be used to generalize a machine learning model to cover the one or more UE operational conditions, effectively improving the reliability, accuracy, and performance of the machine learning operations. Additionally, or alternatively, a network entity and UE may improve a processing overhead and a signaling overhead associated with a data collection process based on configuring UEs to provide model evaluation reports for the one or more UE operational conditions.

Aspects of the disclosure are initially described in the context of wireless communications systems. Aspects of the disclosure are further illustrated by and described with reference to process flows, apparatus diagrams, system diagrams, and flowcharts that relate to model update techniques in wireless communications.

FIG. 1 illustrates an example of a wireless communications system 100 that supports model update techniques in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support model update techniques in wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In accordance with various aspects, described techniques provide for machine learning model generalization in which a machine learning model may be initially configured for a first set of UE operational conditions (e.g., where different condition IDs are associated with different combinations of indoor or outdoor settings, UE antenna configurations, and channel conditions), and the machine learning model may be generalized to apply to one or more conditions that are outside of the first set of conditions. In some aspects, a network entity may provide one or more UEs with one or more machine learning models, and the first set of conditions. Further, the network entity may provide configuration information for model evaluation, in which one or more key performance indicators (KPIs) may be evaluated for conditions outside of the first set of conditions, for use in model generalization. The UE may identify a change in conditions associated with the model generalization, may measure the one or more the KPIs, and transmit an evaluation report to the network entity that indicates the KPIs for the identified condition. In some cases, the evaluation report may indicate a model ID and a condition ID, such that the reported KPIs may be linked to the particular model and UE operational condition for model generalization. The network entity may update the corresponding machine learning model (e.g., based on an aggregation of evaluation reports from multiple UEs) based on the reported KPIs. An updated model configuration may then be provided to UEs for use in subsequent communications.

Figure 2:
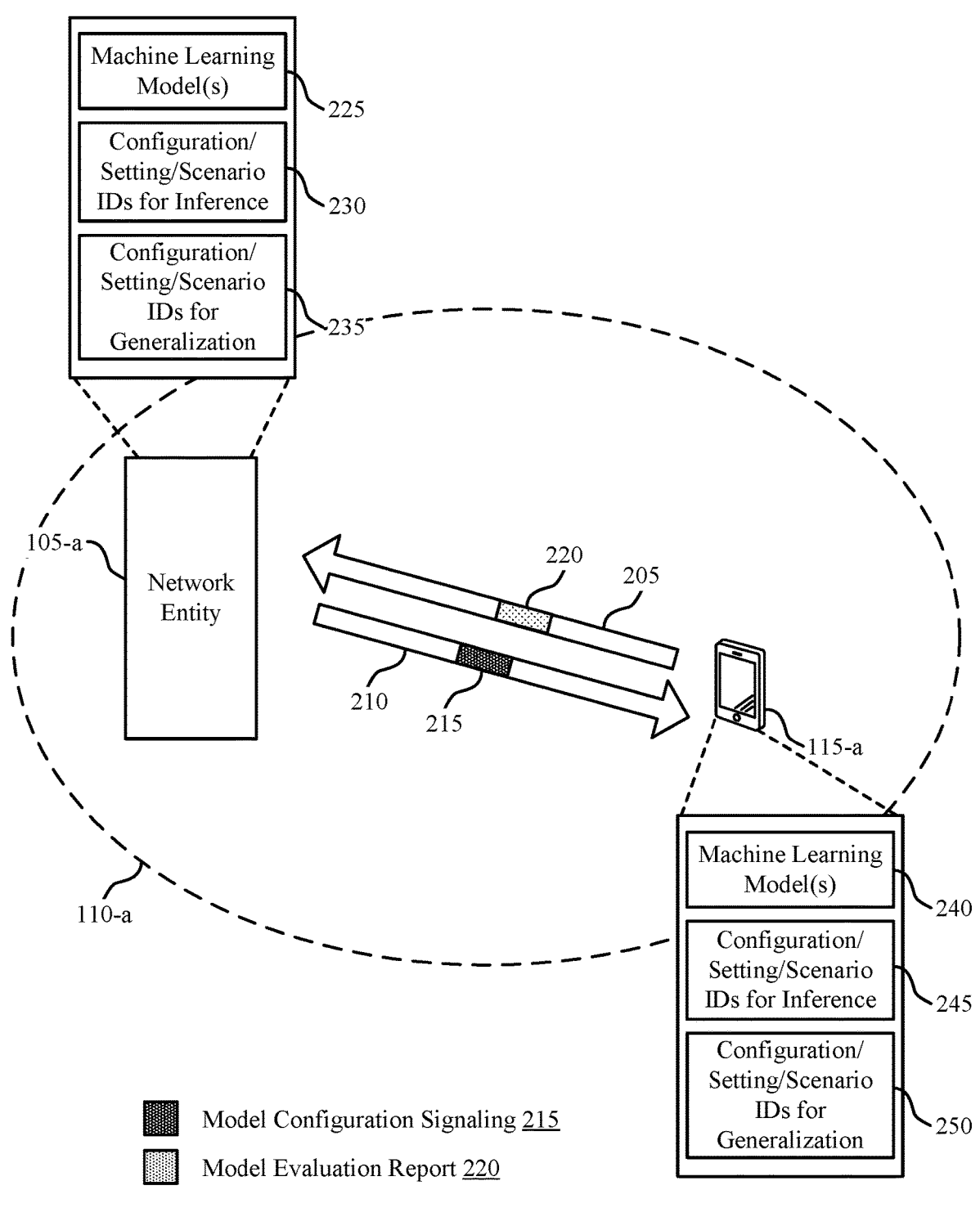
FIG. 2 illustrates an example of a portion of a wireless communications system that supports model update techniques in wireless communications in accordance with one or more aspects of the present disclosure.

FIG. 2 illustrates an example of a wireless communications system 200 that supports model update techniques in wireless communications in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a (e.g., a network node), which may examples of corresponding devices as described herein, that operate in a coverage area 110-a. The UE 115-a may transmit using an uplink communications link 205, and the network entity 105-a may transmit using a downlink communications link 210. The uplink communications link 205 and the downlink communications link 210 may be a same link or carrier (e.g., using TDD), or may be separate links or carriers.

The network entity 105-a, in accordance with various aspects, may configure one or more machine learning models via model configuration signaling 215. In some cases, the network entity 105-a may use one or more machine learning models 225, where each machine learning model 225 may have a first set of configuration/setting/scenario IDs 230 for model inference, and may have a second set of configuration/setting/scenario IDs 235 for generalization. The first set of configuration/setting/scenario IDs 230 may be an example of a set of UE operating conditions, and may include multiple IDs that are each associated with a different combination of UE configurations (e.g., antenna configuration of one or more active antennas or antenna panels, power amplifier configuration, frequency band configuration, etc.), UE settings (e.g., transmit power settings, power control settings, exposure-based settings such as maximum permissible exposure (MPE) or specific absorption rates (SAR) limits, intra-frequency or inter-frequency settings, transmission bandwidth settings, etc.), potential scenarios (e.g., indoor locations, outdoor locations, near-cell locations, cell-edge locations, multi-TRP availability, etc.), or any combinations thereof.

As there may be a very large number of different combinations of configurations, settings, and scenarios, a model of the machine learning models 225 may be trained and verified for operation in fewer than all available different combinations of configurations, settings, and scenarios, and the first set of configuration/setting/scenario IDs 230 may include more common UE operating conditions that are expected. However, in some cases a model may be generalized to provide reliable inferences for other UE operating conditions that are outside of the first set of configuration/setting/scenario IDs 230. For example a first machine learning model may be generalized to include additional UE operating conditions based on one or more measured KPIs of the first machine learning model in such a UE operating condition, where the one or more measured KPIs may indicate that the first machine learning model can reliably be used to determine one or more communications parameters.

In accordance with various aspects, the second set of configuration/setting/scenario IDs 235 for generalization may include one or more combinations of configurations, settings, scenarios, or any combinations thereof, that may be candidates for model generalization. In some cases, the second set of configuration/setting/scenario IDs 235 for generalization may be identified based on observed operation of UEs where a particular configuration/setting/scenario is experienced on a regular basis (e.g., if a particular configuration/setting/scenario occurs on more than a threshold number of occurrences during a moving window time period). In some cases, the network entity 105-a may identify such situations, may assign an ID thereto, and include the conditions in the second set of configuration/setting/scenario IDs 235. In some cases, the network entity 105-a may transmit signaling to the UE 115-a to perform a model evaluation for an identified configuration/setting/scenario ID of the second set of configuration/setting/scenario IDs 235. In some cases, the signaling may be a trigger signal that is transmitted to the UE 115-a that prompts the UE 115-a to measure a set of KPIs associated with the identified configuration/setting/scenario ID. The UE 115-a may transmit a model evaluation report 220 to the network entity 105-a that indicates the measured KPIs, and the network entity 105-a may determine model generalization based on one or more model evaluation reports 220 received from the UE 115-a and optionally one or more other UEs 115. In cases where the model generalization procedure indicates that the machine learning model may be used in one or more additional UE operating conditions, the network entity 105-a may transmit updated model configuration signaling 215 with additional configuration/setting/scenario IDs that corresponds to the one or more additional configurations, settings, or scenarios.

In the example, of FIG. 2, the UE 115-a may include machine learning model(s) 240, a first set of configuration/setting/scenario IDs 245 for inference, and a second set of configuration/setting/scenario IDs 250 for generalization. In some cases, the UE 115-a may select a machine learning model (e.g., indicated by a model ID) and a set of parameters to apply to the machine learning model. The set of parameters may be mapped to a configuration/setting/scenario ID of the first set of configuration/setting/scenario IDs 245. As described herein, a parameter set may correspond to a weight of a machine learning model, or neural network weights of an AI or machine learning model. In some examples, a single machine learning model may be associated with multiple machine learning parameter sets, and a UE operating condition may be used to select one of the parameter sets, based on a configuration, setting, scenario, or any combination thereof, present at the UE 115-a. In some examples, the selected parameter set may be used when running a particular machine learning model to generate a machine learning interference. In some cases, the UE 115-a may be configured with a conditional configuration to change a parameter set while keeping a machine learning model the same (e.g., based on changed configuration, setting, or condition).

As discussed herein, in some cases the UE 115-a may perform a model evaluation for a machine learning model for a configuration/setting/scenario ID of the second set of configuration/setting/scenario IDs 250 based on of a UE operating condition associated with the ID (e.g., based on a detection of the condition at the UE, or a receipt of a trigger signal to perform the model evaluation). In some cases, the second set of configuration/setting/scenario IDs 250 for model generalization may include one or more KPIs that are to be measured and reported by the UE 115-a when generating the model evaluation report 220. Various examples of techniques for model generalization based on model evaluation reports 220 are discussed with reference to FIGS. 3 through 7.

Figure 3:
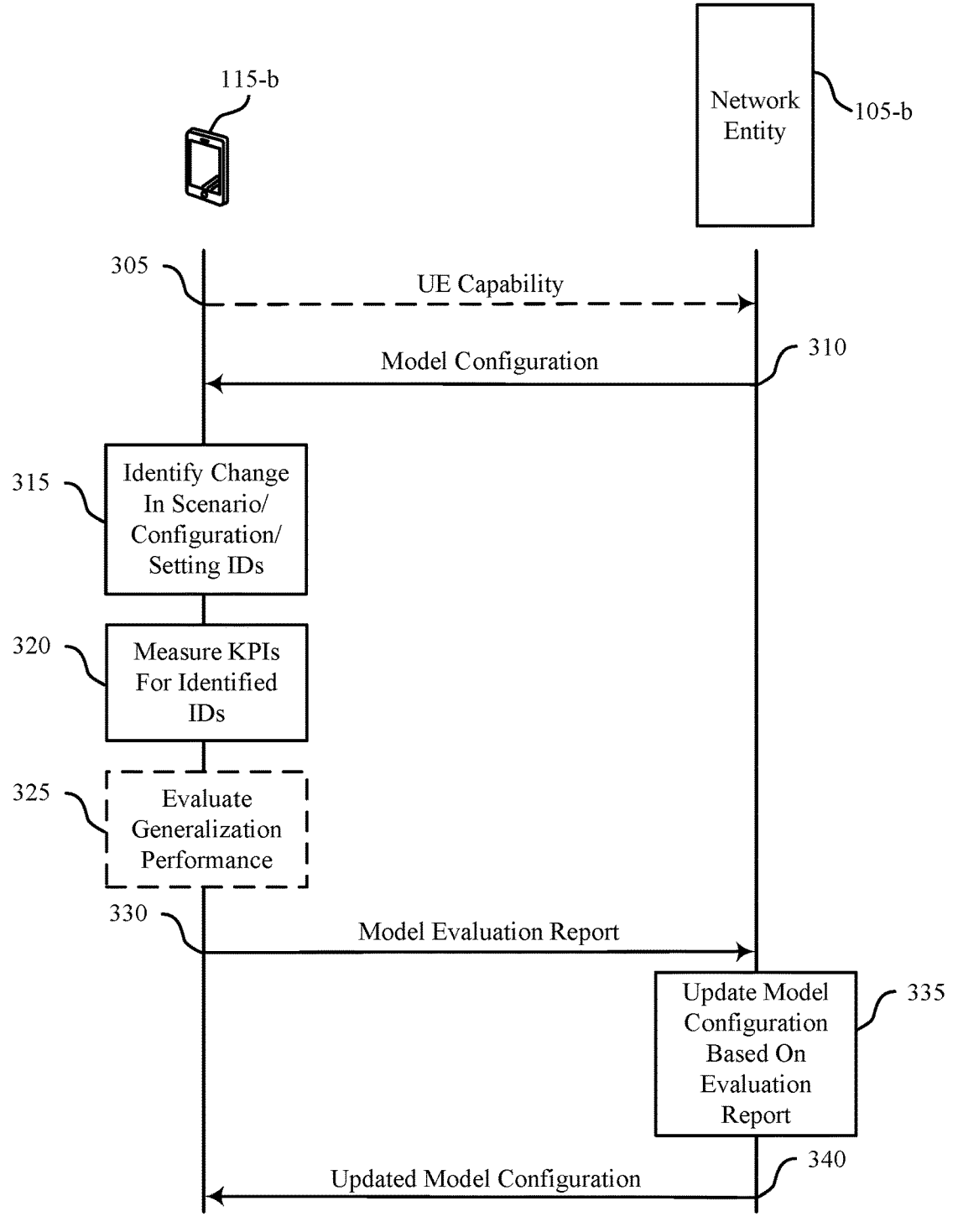
FIGS. 3 through 7 illustrate examples of process flows that support model update techniques in wireless communications in accordance with one or more aspects of the present disclosure.

FIG. 3 illustrates an example of a process flow 300 that supports model update techniques in wireless communications in accordance with one or more aspects of the present disclosure. In some examples, the process flow 300 may implement or be implemented by aspects of wireless communications system 100 or wireless communications system 200. The process flow 300 may include a UE 115-b and a network entity 105-b, which may be examples of a UE 115 and a network entity 105 as described herein. The process flow 300 may illustrate an example of techniques which enable efficient model generalization of a machine learning model. For example, the UE 115-b may perform a model generalization techniques over runtime, providing model evaluation reports that may be used for one or more machine learning models. The UE 115-b and the network entity 105-b may use signaling to communicate (e.g., control channel signaling, shared channel signaling, or any combinations thereof). The signaling may be one or more of radio resource control (RRC) signaling, medium access control (MAC) control element (CE) signaling, physical layer signaling (e.g., a downlink control indication (DCI) and/or uplink control information (UCI)), or any combinations thereof.

At 305, the UE 115-b optionally may transmit a capability message to the network entity 105-b. The capability message may indicate whether the UE 115-b has the ability to perform model generalization procedures (e.g., via KPI measurement and reporting for UE operating conditions that are outside of a first set of UE operating conditions associated with one or more machine learning models). In some cases, the capability message may indicate whether the UE 115-b has a capability to identify a change in scenario/configuration/settings and measure KPIs, has a capability to receive a trigger signal (e.g., an indication via RRC, MAC-CE, or DCI) to provoke a model evaluation for an identified UE operating condition ID (e.g., a scenario/configuration/setting ID of a second set of scenario/configuration/setting IDs for model generalization), or both.

At 310 the network entity 105-b may transmit, and the UE 115-b may receive, model configuration signaling. In some cases, the model configuration signaling may include one or more model IDs, a first set of scenario/configuration/setting IDs for inference, and a second set of scenario/configuration/setting IDs for model generalization. In some cases, the model configuration signaling may be transmitted via RRC signaling, MAC-CE signaling, physical layer signaling, or any combinations thereof. In some cases, the UE 115-b may transmit a configuration complete indication (e.g., a RRC configuration complete message) to the network entity 105-b based on successful receipt and processing of the model configuration signaling.

At 315, the UE 115-b may identify a change in the configured configuration/setting/scenario IDs. In some cases, such an identification may be made based on detection of a configuration, setting, and scenario that are associated with a scenario/configuration/setting ID of the second set of scenario/configuration/setting IDs. For example, a combination of a first operating bandwidth, and a first set of active antennas of the UE 115-a may not be included in the first set of scenario/configuration/setting IDs for inference, and may be included in the second set of scenario/configuration/setting IDs for generalization.

At 320, the UE 115-b may, upon detection of the configured IDs for generalization, measure one or more KPIs for the identified ID. In some cases, a set of KPIs may be associated with each ID of the second set of scenario/configuration/setting IDs. In some examples, the set of KPIs may include one or more of reference signal received power (RSRP), reference signal received quality (RSRQ), link latency (e.g., round trip time (RTT) latency), downlink throughput, uplink user throughput, downlink packet loss rate, uplink packet loss rate, or any combinations thereof.

At 325, the UE 115-b optionally may evaluate generalization performance of the machine learning model for the identified scenario/configuration/setting ID. In some cases, such an evaluation may be based on a value of one or more KPIs of the set of KPIs relative to an associated threshold value.

At 330, the UE 115-b may transmit, and the network entity 105-b may receive, a model evaluation report (e.g., via RRC, MAC-CE, or UCI, or any combinations thereof). In some cases, the model evaluation report may include an indication of the model ID, an indication of the scenario/configuration/setting ID, and one or more of the identified KPI values. In cases where the UE 115-b may evaluate generalization performance, the model evaluation report may additionally, or alternatively, include an indication of the configured scenario/configuration/setting ID(s) for which one or more model ID(s) may be generalized.

At 335, the network entity 105-b may update the model configuration based on the model evaluation report. In some cases, the network entity 105-b may aggregate model evaluation reports from multiple UEs to determine the model update. At 340, the network entity 105-b may transmit, and the UE 115-b may receive, updated model configuration signaling. In some cases, the updated model configuration signaling may include one or more additional IDs in the first set of scenario/configuration/setting IDs for inference.

Figure 4:
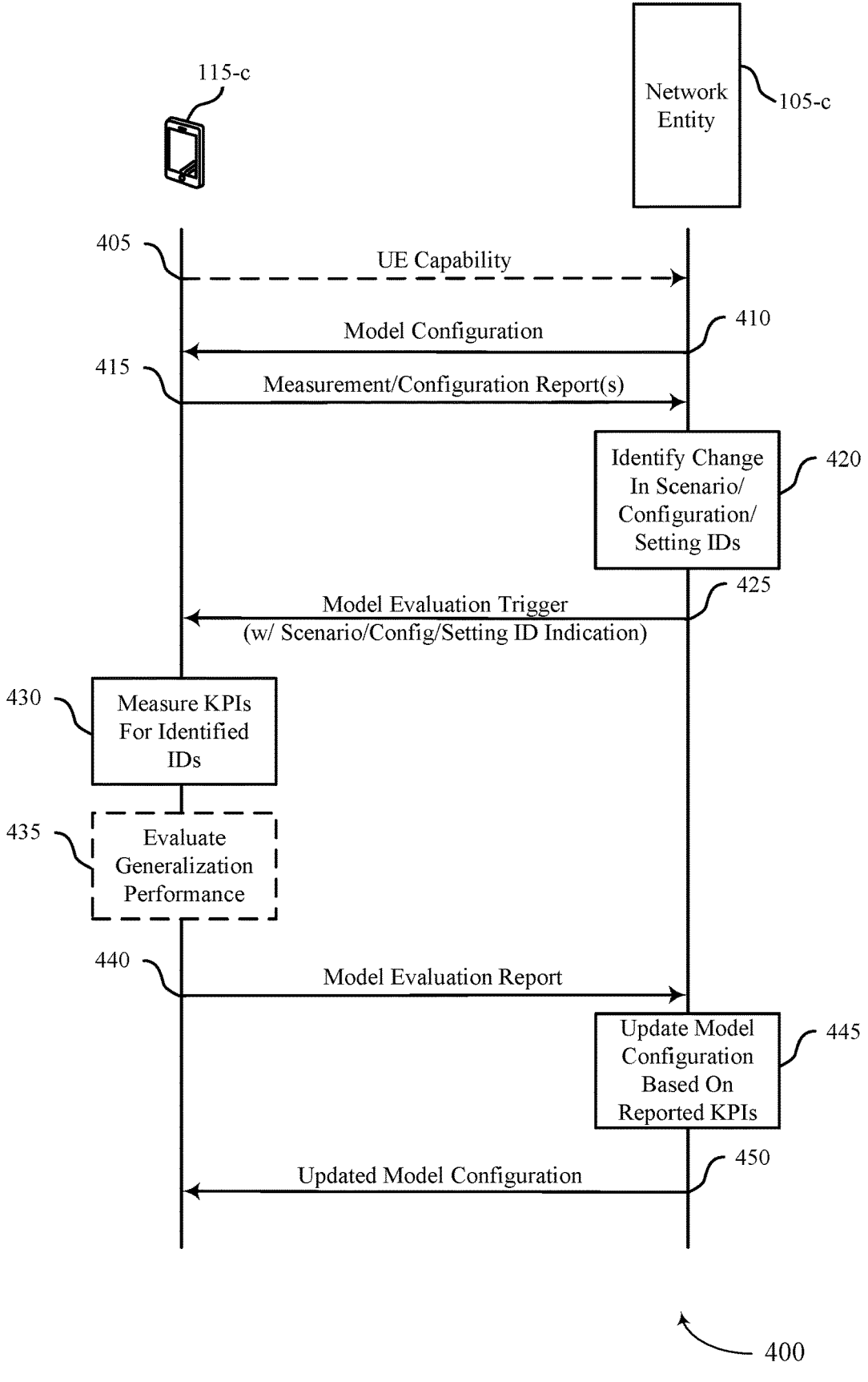

FIG. 4 illustrates an example of a process flow 400 that supports model update techniques in wireless communications in accordance with one or more aspects of the present disclosure. In some examples, the process flow 400 may implement or be implemented by aspects of wireless communications system 100 or wireless communications system 200. The process flow 400 may include a UE 115-c and a network entity 105-c, which may be examples of a UE 115 and a network entity 105 as described herein. The process flow 400 may illustrate an example of techniques which enable efficient model generalization of a machine learning model. For example, the UE 115-c may perform a model generalization techniques over runtime, providing model evaluation reports that may be used for one or more machine learning models. The UE 115-c and the network entity 105-c may use signaling to communicate (e.g., control channel signaling, shared channel signaling, or any combinations thereof). The signaling may be one or more of RRC signaling, MAC-CE signaling, physical layer signaling (e.g., DCI/UCI), or any combinations thereof.

At 405, the UE 115-c optionally may transmit a capability message to the network entity 105-c. The capability message may indicate whether the UE 115-c has the ability to perform model generalization procedures (e.g., via KPI measurement and reporting for UE operating conditions that are outside of a first set of UE operating conditions associated with one or more machine learning models). In some cases, the capability message may indicate whether the UE 115-c has a capability to identify a change in scenario/configuration/settings and measure KPIs, has a capability to receive a trigger signal (e.g., an indication via RRC, MAC-CE, or DCI) to provoke a model evaluation for an identified UE operating condition ID (e.g., a scenario/configuration/setting ID of a second set of scenario/configuration/setting IDs for model generalization), or both. In some cases, the capability message may be transmitted via RRC signaling, MAC-CE signaling, physical layer signaling, or any combinations thereof.

At 410 the network entity 105-c may transmit, and the UE 115-c may receive, model configuration signaling. In some cases, the model configuration signaling may include one or more model IDs, a first set of scenario/configuration/setting IDs for inference, and a second set of scenario/configuration/setting IDs for model generalization. In some cases, the model configuration signaling may be transmitted via RRC signaling, MAC-CE signaling, physical layer signaling, or any combinations thereof. In some cases, the UE 115-c may transmit a configuration complete indication (e.g., a RRC configuration complete message) to the network entity 105-c based on successful receipt and processing of the model configuration signaling.

At 415, the UE 115-c may transmit, and the network entity 105-c may receive, one or more measurement reports, configuration reports, or any combinations thereof. In some cases, the measurement/configuration reports may include information related to UE measurements (e.g., channel state information (CSI) measurements), UE configuration (e.g., UE antenna configuration, UE power settings, UE frequency range configuration, or combinations thereof). In some cases, the measurement/configuration reports may be transmitted via RRC signaling, MAC-CE signaling, physical layer signaling, or any combinations thereof.

At 420, the network entity 105-c may identify a change in the configured configuration/setting/scenario IDs. In some cases, such an identification may be made based on detection of a configuration, setting, and scenario at the UE 115-*c* (e.g., based on the measurement/configuration report(s)) that are associated with a scenario/configuration/setting ID of the second set of scenario/configuration/setting IDs. For example, a combination of outdoor operation in a cell-edge location with a first maximum transmit power and a first subset of active antennas of the UE 115-*a* may not be included in the first set of scenario/configuration/setting IDs for inference, and may be included in the second set of scenario/configuration/setting IDs for generalization.

At 425, the network entity 105-*c* may transmit, and the UE 115-*c* may receive, a model evaluation trigger signal. In some cases, the model evaluation trigger signal may indicate one or more of the identified scenario/configuration/setting ID, a model ID, an indication of a set of KPIs to be measured, or a start/end time for performing the measurement. In some cases, additionally, or alternatively, the identified scenario/configuration/setting ID may be included in the second set of scenario/configuration/setting IDs, and the UE 115-*c* may identify the KPIs and model ID based on the second set of second set of scenario/configuration/setting IDs. In some cases, the model evaluation trigger signal may be transmitted via RRC signaling, MAC-CE signaling, physical layer signaling, or any combinations thereof.

At 430, upon detection of the model evaluation trigger signal, the UE may measure one or more KPIs for the identified ID. In some cases, a set of KPIs may be associated with each ID of the second set of scenario/configuration/setting IDs. In some examples, the set of KPIs may include one or more of RSRP, RSRQ, link latency (e.g., RTT latency), downlink throughput, uplink user throughput, downlink packet loss rate, uplink packet loss rate, or any combinations thereof.

At 435, the UE 115-*c* optionally may evaluate generalization performance of the machine learning model for the identified scenario/configuration/setting ID. In some cases, such an evaluation may be based on a value of one or more KPIs of the set of KPIs relative to an associated threshold value.

At 440, the UE 115-*c* may transmit, and the network entity 105-*c* may receive, a model evaluation report (e.g., via RRC, MAC-CE, UCI, or any combinations thereof). In some cases, the model evaluation report may be transmitted upon receipt of an indication from the network entity 105-*c* to transmit the report. In some cases, the model evaluation report may include an indication of the model ID, an indication of the scenario/configuration/setting ID, and one or more of the identified KPI values. In cases where the UE 115-*c* may evaluate generalization performance, the model evaluation report may additionally, or alternatively, include an indication of the configured scenario/configuration/setting ID(s) for which one or more model ID(s) may be generalized.

At 445, the network entity 105-*c* may update the model configuration based on the model evaluation report. In some cases, the network entity 105-*c* may aggregate model evaluation reports from multiple UEs to determine the model update. At 450, the network entity 105-*c* may transmit, and the UE 115-*c* may receive, updated model configuration signaling. In some cases, the updated model configuration signaling may include one or more additional IDs in the first set of scenario/configuration/setting IDs for inference.

Figure 5:
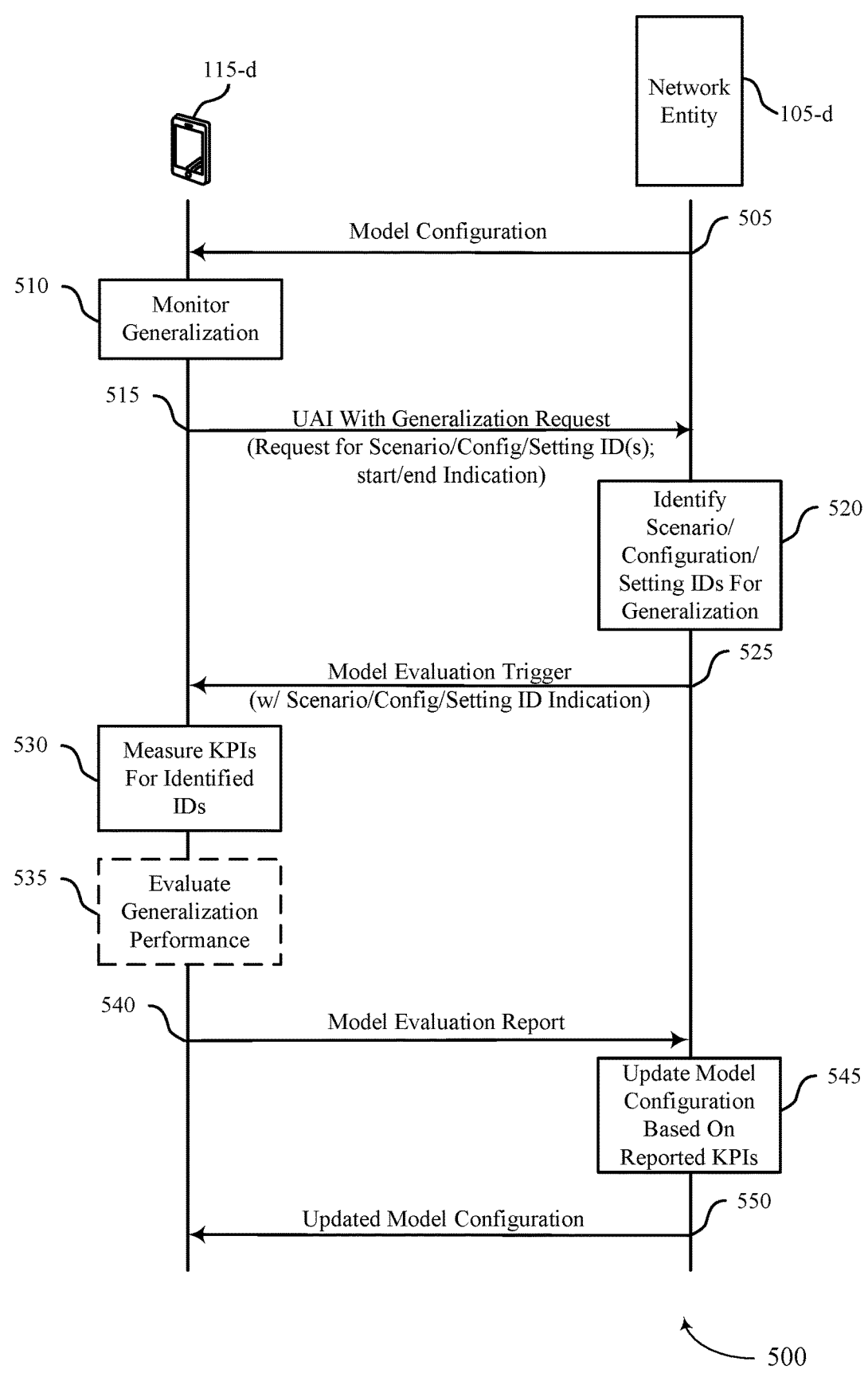

FIG. 5 illustrates an example of a process flow 500 that supports model update techniques in wireless communications in accordance with one or more aspects of the present disclosure. In some examples, the process flow 500 may implement or be implemented by aspects of wireless communications system 100 or wireless communications system 200. The process flow 500 may include a UE 115-*d* and a network entity 105-*d*, which may be examples of a UE 115 and a network entity 105 as described herein. The process flow 500 may illustrate an example of techniques which enable efficient model generalization of a machine learning model. For example, the UE 115-*d* may perform a model generalization techniques over runtime, providing model evaluation reports that may be used for one or more machine learning models. The UE 115-*d* and the network entity 105-*d* may use signaling to communicate (e.g., control channel signaling, shared channel signaling, or any combinations thereof). The signaling may be one or more of RRC signaling, MAC-CE signaling, physical layer signaling (e.g., DCI/ UCI), or any combinations thereof.

At 505 the network entity 105-*d* may transmit, and the UE 115-*d* may receive, model configuration signaling. In some cases, the model configuration signaling may include one or more model IDs, and a first set of scenario/configuration/ setting IDs for inference. In some cases, the model configuration signaling may be transmitted via RRC signaling, MAC-CE signaling, physical layer signaling, or any combinations thereof. In some cases, the UE 115-*d* may transmit a configuration complete indication (e.g., a RRC configuration complete message) to the network entity 105-*d* based on successful receipt and processing of the model configuration signaling.

At 510, the UE 115-*d* may monitor for model generalization. In some cases, the UE 115-*d* may monitor for model generalization based on detection of a configuration, setting, and/or scenario that is outside of the first set of scenario/ configuration/setting IDs for model generalization.

At 515, responsive to determining that the identified machine learning model can be generalized to the identified scenario/configuration/setting ID, the UE 115-*d* may transmit, and the network entity 105-*d* may receive, a model generalization request, such as in a UE assistance information (UAI) message. In some cases, the model generalization request may include a request for a second set of scenario/ configuration/setting IDs for model generalization. Additionally, or alternatively, the model generalization request may include a start time indication, an end time indication, or both, that indicates that the UE 115-*d* requests the network entity 105-*d* to send an indication of when measurements of the scenario/configuration/setting IDs starts, and when measurements of the scenarios/configuration/ setting IDs ends. In some cases, a single indication may be sufficient when one requested scenario/configuration/setting ID starts, and another configured scenario/configuration/ setting IDs ends.

At 520, the network entity 105-*d* may identify a change in the configured configuration/setting/scenario IDs based on the model generalization request. In some cases, such an identification may be made based on detection of a configuration, setting, and scenario at the UE 115-*d* that are associated with a scenario/configuration/setting ID of the second set of scenario/configuration/setting IDs.

At 525, the network entity 105-*d* may transmit, and the UE 115-*d* may receive, a model evaluation trigger signal. In some cases, the model evaluation trigger signal may indicate one or more of the identified scenario/configuration/setting ID, a model ID, an indication of a set of KPIs to be measured, or a start/end time for performing the measurement. In some cases, additionally, or alternatively, the identified scenario/configuration/setting ID may be included in the second set of scenario/configuration/setting IDs, and the UE 115-*d* may identify the KPIs and model ID based on the second set of second set of scenario/configuration/setting IDs. In some cases, the model evaluation trigger signal may be transmitted via RRC signaling, MAC-CE signaling, physical layer signaling, or any combinations thereof.

At 530, upon detection of the model evaluation trigger signal, the UE 115-*d* may measure one or more KPIs for the identified ID. In some cases, a set of KPIs may be associated with each ID of the second set of scenario/configuration/setting IDs. In some examples, the set of KPIs may include one or more of RSRP, RSRQ, link latency (e.g., RTT latency), downlink throughput, uplink user throughput, downlink packet loss rate, uplink packet loss rate, or any combinations thereof.

At 535, the UE 115-*d* optionally may evaluate generalization performance of the machine learning model for the identified scenario/configuration/setting ID. In some cases, such an evaluation may be based on a value of one or more KPIs of the set of KPIs relative to an associated threshold value.

At 540, the UE 115-*d* may transmit, and the network entity 105-*d* may receive, a model evaluation report (e.g., via RRC, MAC-CE, or UCI, or any combinations thereof). In some cases, the model evaluation report may be transmitted upon receipt of an indication from the network entity 105-*d* to transmit the report. In some cases, the model evaluation report may include an indication of the model ID, an indication of the scenario/configuration/setting ID, and one or more of the identified KPI values. In cases where the UE 115-*d* may evaluate generalization performance, the model evaluation report may additionally, or alternatively, include an indication of the configured scenario/configuration/setting ID(s) for which one or more model ID(s) may be generalized.

At 545, the network entity 105-*d* may update the model configuration based on the model evaluation report. In some cases, the network entity 105-*d* may aggregate model evaluation reports from multiple UEs to determine the model update. At 550, the network entity 105-*d* may transmit, and the UE 115-*d* may receive, updated model configuration signaling. In some cases, the updated model configuration signaling may include one or more additional IDs in the first set of scenario/configuration/setting IDs for inference.

Figure 6:
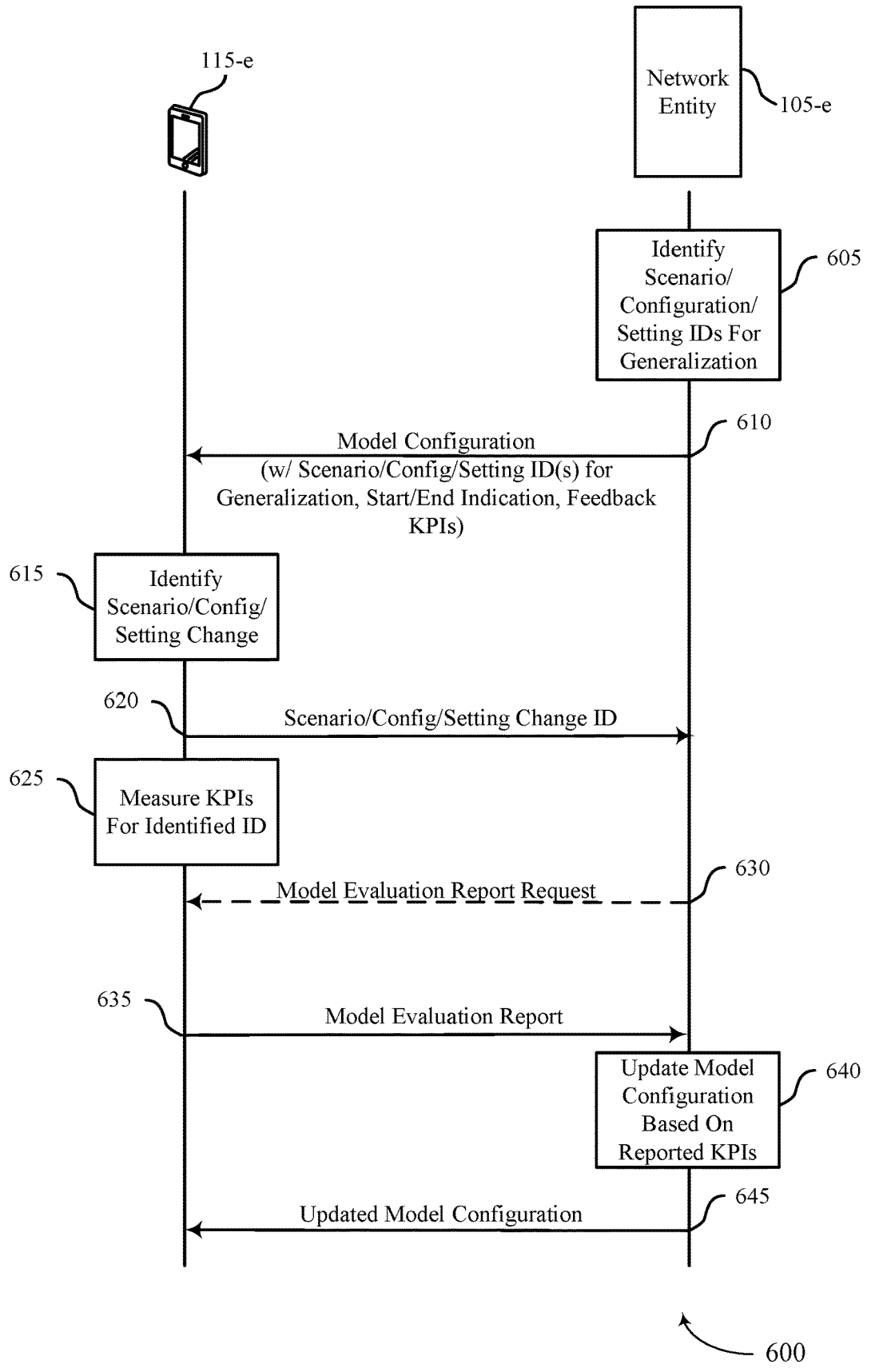

FIG. 6 illustrates an example of a process flow 600 that supports model update techniques in wireless communications in accordance with one or more aspects of the present disclosure. In some examples, the process flow 600 may implement or be implemented by aspects of wireless communications system 100 or wireless communications system 200. The process flow 600 may include a UE 115-*e* and a network entity 105-*e*, which may be examples of a UE 115 and a network entity 105 as described herein. The process flow 600 may illustrate an example of techniques which enable efficient model generalization of a machine learning model. For example, the UE 115-*e* may perform a model generalization techniques over runtime, providing model evaluation reports that may be used for one or more machine learning models. The UE 115-*e* and the network entity 105-*e* may use signaling to communicate (e.g., control channel signaling, shared channel signaling, or any combinations thereof). The signaling may be one or more of RRC signaling, MAC-CE signaling, physical layer signaling (e.g., DCI/UCI), or any combinations thereof.

At 605, the network entity 105-*e* may identify scenario/configuration/setting IDs for model generalization. In some cases, the scenario/configuration/setting IDs for model generalization may be included in a second set of scenario/configuration/setting IDs, where a first set of scenario/ configuration/setting IDs may be configured for inference along with one or more model IDs, for one or more machine learning models that may be used to determine communications parameters between the UE 115-*e* and the network entity 105-*e*.

At 610 the network entity 105-*e* may transmit, and the UE 115-*e* may receive, model configuration signaling. In some cases, the model configuration signaling may include the scenario/configuration/setting IDs for model generalization. Further, in some cases, the model configuration may also include an indication of when monitoring of the indicated scenarios/configuration/setting IDs for model generalization starts, when monitoring of the indicated scenarios/configuration/setting IDs for model generalization ends, or both. In some cases, a single indication may be sufficient when one requested scenario/configuration/setting ID starts, and another configured scenario/configuration/setting IDs ends. In some cases, the model configuration signaling may also include one or more model IDs, a first set of scenario/configuration/setting IDs for inference, while in other cases some of all of such configuration information may be provided separately. In some cases, the model configuration signaling may be transmitted via RRC signaling, MAC-CE signaling, physical layer signaling, or any combinations thereof. In some cases, the UE 115-*e* may transmit a configuration complete indication (e.g., a RRC configuration complete message) to the network entity 105-*e* based on successful receipt and processing of the model configuration signaling.

At 615, the UE 115-*e* may identify a change in the configured configuration/setting/scenario IDs. In some cases, such an identification may be made based on detection of a configuration, setting, and scenario that are associated with an indicated scenario/configuration/setting ID for model generalization.

At 620, the UE 115-*e* may transmit, and the network entity 105-*e* may receive, a configuration/setting/scenario ID change indication that indicates the identified configuration/setting/scenario ID for model generalization. In some cases, the configuration/setting/scenario ID change indication may be transmitted via RRC signaling, MAC-CE signaling, physical layer signaling, or any combinations thereof.

At 625, the UE 115-*e* may measure one or more KPIs for the identified ID. In some cases, a set of KPIs may be associated with each ID of the scenario/configuration/setting IDs for model generalization. In some examples, the set of KPIs may include one or more KPIs such as, for example, one or more of RSRP, RSRQ, link latency (e.g., RTT latency), downlink throughput, uplink user throughput, downlink packet loss rate, uplink packet loss rate, or any combinations thereof.

At 630, the network entity 105-*e* may optionally transmit a model evaluation report request that may be received at the UE 115-*e*. In some cases, the model evaluation report request may be transmitted when the network entity 105-*e* identifies that resources are available for scheduling such a report transmission, or based on receipt of a threshold number of scenario/configuration/setting ID change indications from one or more UEs 115.

At 635, the UE 115-*e* may transmit, and the network entity 105-*e* may receive, the model evaluation report (e.g., via RRC, MAC-CE, or UCI, or any combinations thereof). In some cases, the model evaluation report may include an indication of the model ID, an indication of the scenario/configuration/setting ID, and one or more of the identified KPI values. In some cases, the UE 115-*e* may evaluate generalization performance, and the model evaluation report may additionally, or alternatively, include an indication of the scenario/configuration/setting ID for which one or more model ID(s) may be generalized.

At 640, the network entity 105-*e* may update the model configuration based on the model evaluation report. In some cases, the network entity 105-*e* may aggregate model evaluation reports from multiple UEs to determine the model update. At 645, the network entity 105-*e* may transmit, and the UE 115-*e* may receive, updated model configuration signaling. In some cases, the updated model configuration signaling may include one or more additional IDs in the first set of scenario/configuration/setting IDs for inference.

Figure 7:
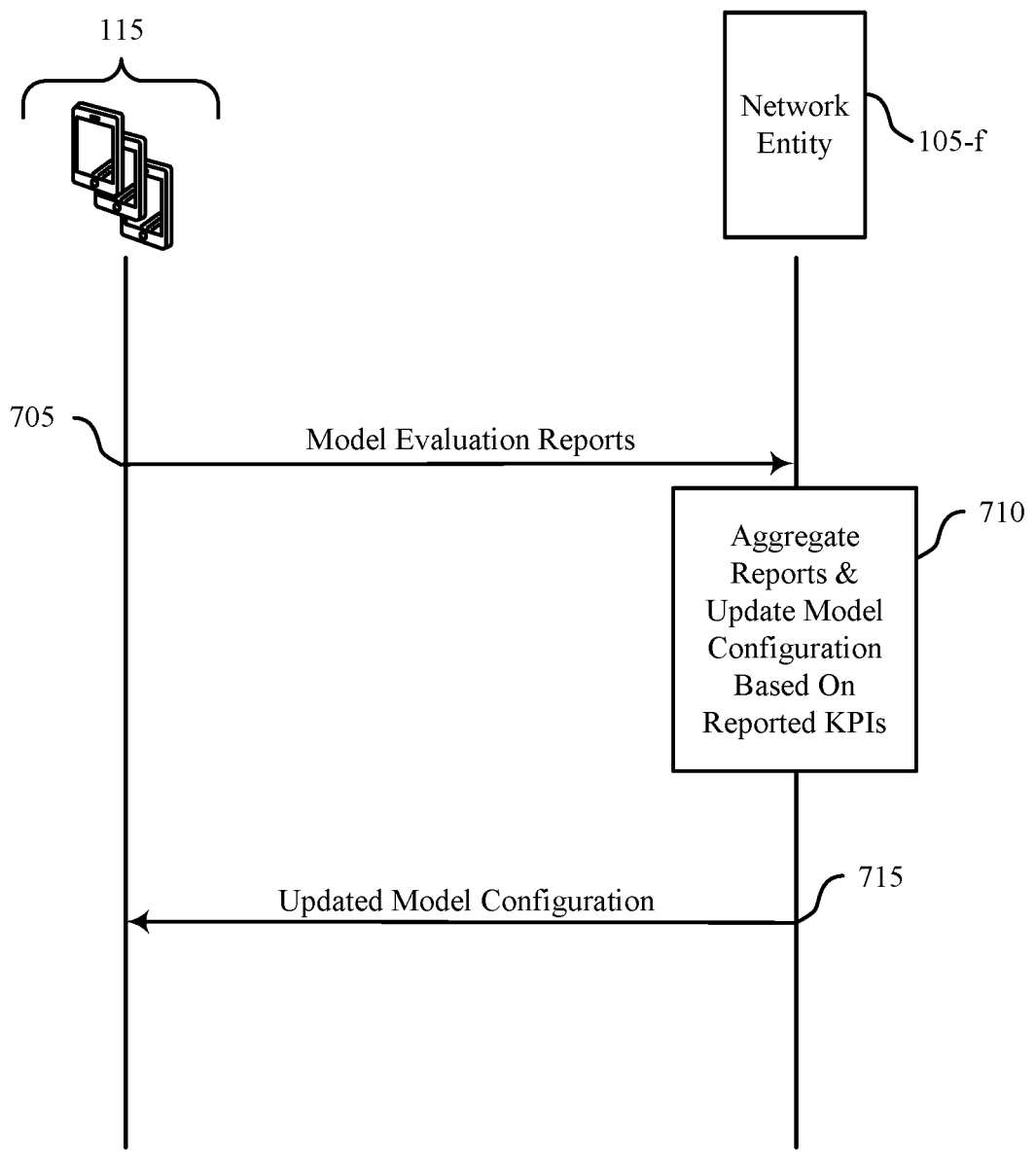

FIG. 7 illustrates an example of a process flow 700 that supports model update techniques in wireless communications in accordance with one or more aspects of the present disclosure. In some examples, the process flow 700 may implement or be implemented by aspects of wireless communications system 100 or wireless communications system 200. The process flow 700 may include multiple UEs 115 and a network entity 105-*f*, which may be examples of UEs 115 and a network entity 105 as described herein. The process flow 700 may illustrate an example of techniques which enable efficient model generalization of a machine learning model. For example, the UEs 115 may perform a model generalization techniques over runtime, providing model evaluation reports that may be used for one or more machine learning models. The UEs 115 and the network entity 105-*f* may use signaling to communicate (e.g., control channel signaling, shared channel signaling, or any combinations thereof). The signaling may be one or more of RRC signaling, MAC-CE signaling, physical layer signaling (e.g., DCI/UCI), or any combinations thereof. The UEs 115 and network entity 105-*f* may be configured with machine learning models and associated model IDs and first and second sets of scenario/configuration/setting IDs, in accordance with various techniques as discussed herein.

At 705, multiple of the UEs 115 may transmit, and the network entity 105-*f* may receive, the model evaluation reports (e.g., via RRC, MAC-CE, or UCI, or any combinations thereof). In some cases, the model evaluation reports may include an indication of a model ID, an indication of a scenario/configuration/setting ID, and one or more of identified KPI values. In some cases, the UEs 115 may evaluate generalization performance, and the model evaluation report may additionally, or alternatively, include an indication of scenario/configuration/setting ID(s) for which one or more model ID(s) may be generalized.

At 710, the network entity 105-*f* may aggregate model evaluation reports from the UEs 115 to determine one or more model updates based on the model evaluation reports (e.g., based on provided KPIs). In some cases, a model update may be determined based on multiple reports in which KPIs indicate suitable model performance for a scenario/configuration/setting ID that was configured for model generalization. In some cases, the one or more model updates may be based on model tuning that incorporates the KPIs for the indicated scenario/configuration/setting IDs, KPIs reported for scenario/configuration/setting IDs for inference for one or more model IDs, or any combinations thereof.

At 715, the network entity 105-*f* may transmit, and the UEs 115 may receive, updated model configuration signaling. In some cases, the updated model configuration signaling may include one or more additional IDs that may be used with one or more model IDs for inference.

Figure 8:
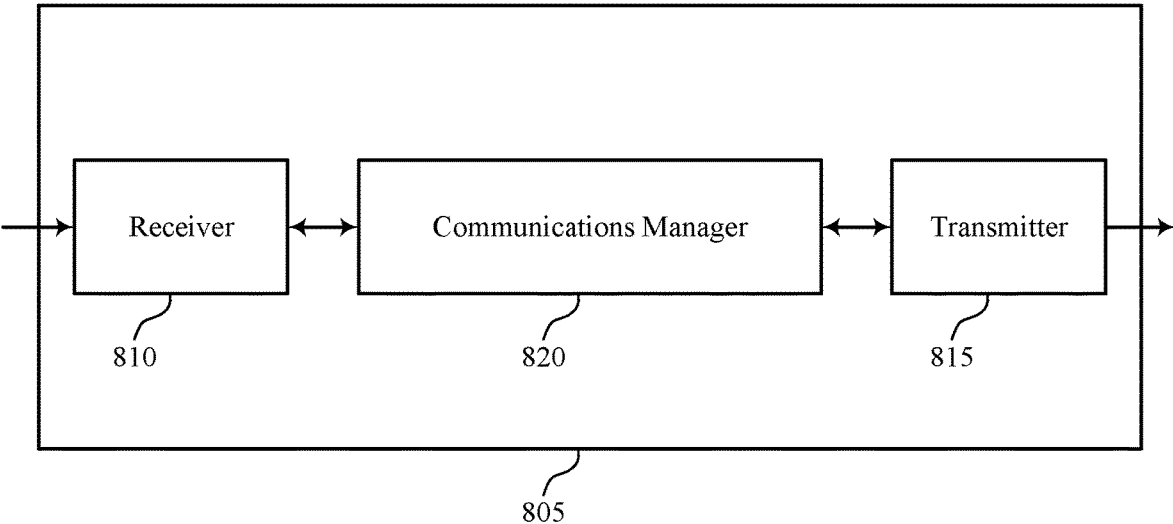
FIGS. 8 and 9 illustrate block diagrams of devices that support model update techniques in wireless communications in accordance with one or more aspects of the present disclosure.
Figure 8:

FIG. 8 illustrates a block diagram 800 of a device 805 that supports model update techniques in wireless communications in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to model update techniques in wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to model update techniques in wireless communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of model update techniques in wireless communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for receiving signaling indicating a model configuration for at least a first machine learning model used to determine, for a first set of UE operating conditions, one or more parameters for wireless communications at the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The communications manager 820 may be configured as or otherwise support a means for measuring one or more metrics associated with the set of performance indicators responsive to a detection of one or more UE operational conditions associated with the first condition ID. The communications manager 820 may be configured as or otherwise support a means for transmitting a model evaluation report that includes the first condition ID and the one or more metrics associated with the set of performance indicators.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for machine learning model generalization through configuration of model evaluations for UE operational conditions, which may improve the operation of machine learning models, effectively improving the resulting machine learning models. Such machine learning models may reduce processing overhead, enhance communications throughput and reliability, and enhance overall user experience.

Figure 9:
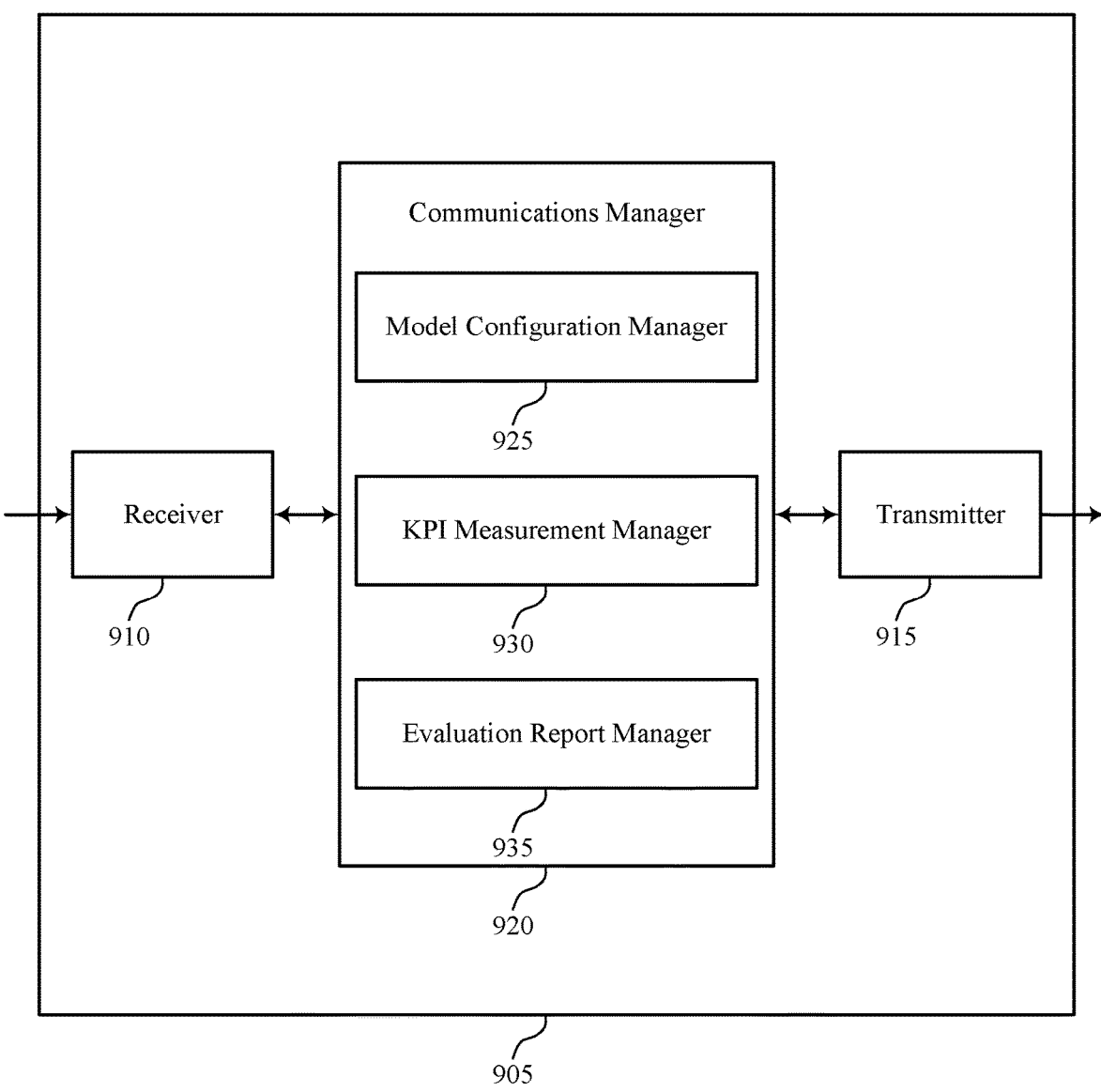

FIG. 9 illustrates a block diagram 900 of a device 905 that supports model update techniques in wireless communications in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to model update techniques in wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to model update techniques in wireless communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of model update techniques in wireless communications as described herein. For example, the communications manager 920 may include a model configuration manager 925, a KPI measurement manager 930, an evaluation report manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The model configuration manager 925 may be configured as or otherwise support a means for receiving signaling indicating a model configuration for at least a first machine learning model used to determine, for a first set of UE operating conditions, one or more parameters for wireless communications at the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions. The KPI measurement manager 930 may be configured as or otherwise support a means for measuring one or more metrics associated with the set of performance indicators responsive to a detection of one or more UE operational conditions associated with the first condition ID. The evaluation report manager 935 may be configured as or otherwise support a means for transmitting a model evaluation report that includes the first condition ID and the one or more metrics associated with the set of performance indicators.

Figure 10:
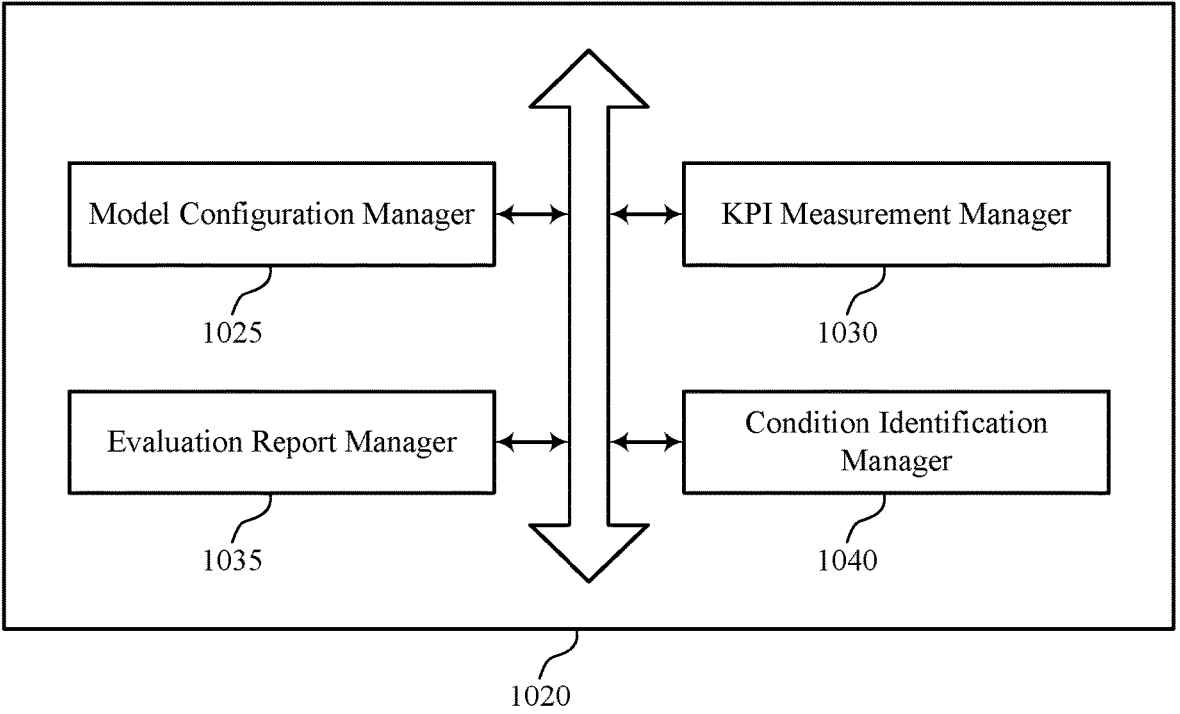
FIG. 10 illustrates a block diagram of a communications manager that supports model update techniques in wireless communications in accordance with one or more aspects of the present disclosure.
Figure 10:

FIG. 10 illustrates a block diagram 1000 of a communications manager 1020 that supports model update techniques in wireless communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of model update techniques in wireless communications as described herein. For example, the communications manager 1020 may include a model configuration manager 1025, a KPI measurement manager 1030, an evaluation report manager 1035, a condition identification manager 1040, or any combination thereof. Each of these components may communicate, directly or indirectly, with one another (e.g., via one or more buses).

The communications manager 1020 may support wireless communication at a UE in accordance with examples as disclosed herein. The model configuration manager 1025 may be configured as or otherwise support a means for receiving signaling indicating a model configuration for at least a first machine learning model used to determine, for a first set of UE operating conditions, one or more parameters for wireless communications at the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and the second set of UE operational conditions include at least a first condition ID that corresponds to one or more of a scenario, configuration, or setting of the UE that is outside of the first set of UE operational conditions. The KPI measurement manager 1030 may be configured as or otherwise support a means for measuring one or more metrics associated with the set of performance indicators responsive to a detection of one or more UE operational conditions associated with the first condition ID. The evaluation report manager 1035 may be configured as or otherwise support a means for transmitting a model evaluation report that includes the first condition ID and the one or more metrics associated with the set of performance indicators.

In some examples, to support receiving the model configuration, the model configuration manager 1025 may be configured as or otherwise support a means for receiving configuration information for a set of multiple models, where each model of the set of multiple models has one or more corresponding sets of performance indicators and one or more corresponding sets of UE operational conditions for transmitting the model evaluation report for the evaluation of model applicability or generalization outside of an associated initial set of conditions for each model of the set of multiple models. In some examples, the evaluation report manager 1035 may be configured as or otherwise support a means for transmitting one or more additional model evaluation reports for at least a second machine learning model of the set of multiple models.

In some examples, the condition identification manager 1040 may be configured as or otherwise support a means for determining that the one or more UE operational conditions associated with the first condition ID are present at the UE based on one or more measurements of one or more reference signals at the UE, a hardware configuration of the UE, one or more settings of the UE, or any combinations thereof. In some examples, the measuring includes measuring a first set of metrics associated with the first condition ID. In some examples, the condition identification manager 1040 may be configured as or otherwise support a means for transmitting an indication of the first condition ID to a network entity that indicates the one or more UE operational conditions associated with the first condition ID are present at the UE. In some examples, the KPI measurement manager 1030 may be configured as or otherwise support a means for receiving, from the network entity, a trigger that indicates the first set of metrics associated with the first condition ID are to be measured.

In some examples, the model configuration manager 1025 may be configured as or otherwise support a means for determining one or more parameters for wireless communications based on second condition of the first set of UE operational conditions and the first machine learning model. In some examples, the model configuration manager 1025 may be configured as or otherwise support a means for communicating with a network entity based on the one or more parameters.

In some examples, the KPI measurement manager 1030 may be configured as or otherwise support a means for receiving an indication of a change associated with the first condition ID. In some examples, the measuring and the transmitting are performed responsive to the indication of the change associated with the first condition ID.

In some examples, the condition identification manager 1040 may be configured as or otherwise support a means for transmitting, to a network entity, a request for one or more condition IDs to be measured at the UE. In some examples, the receiving the model configuration is responsive to the request. In some examples, the request indicates one or more of a start time or a stop time for one or more associated condition IDs. In some examples, the model evaluation report includes one or more model IDs, one or more condition IDs associated with each of the one or more model IDs, and one or more metrics associated with the set of performance indicators of each reported condition ID.

In some examples, the model configuration manager 1025 may be configured as or otherwise support a means for receiving an updated model configuration for the first machine learning model. In some examples, the updated model configuration is based on the model evaluation report and one or more other model evaluation reports provided by one or more other UEs, and the updated model configuration for the first machine learning model provides an updated first set of UE operational conditions. In some examples, the model configuration manager 1025 may be configured as or otherwise support a means for determining one or more parameters for wireless communications using the updated model configuration when one or more of the scenario, configuration, or setting of the UE corresponds to the first condition ID.

Figure 11:
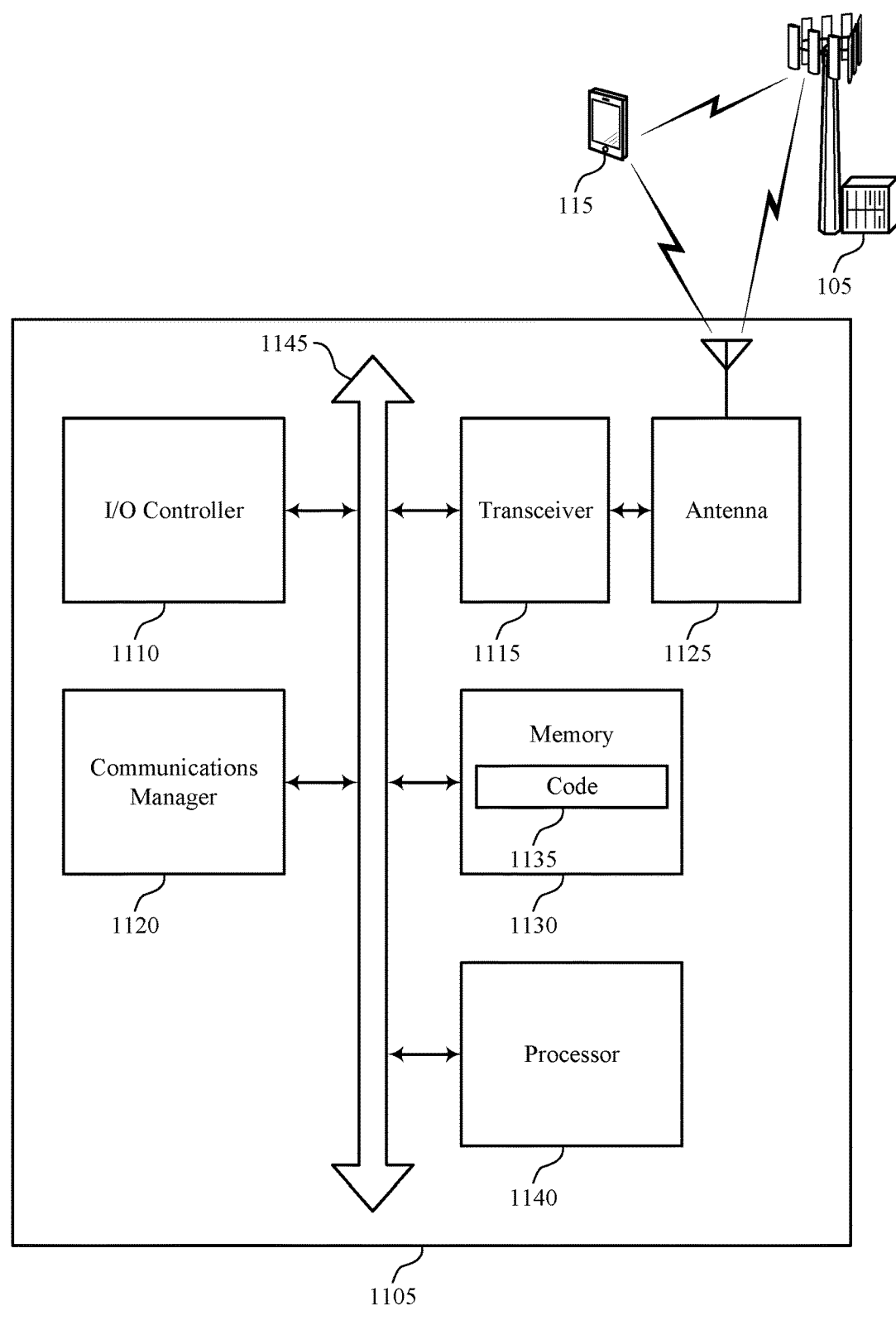
FIG. 11 illustrates a diagram of a system including a device that supports model update techniques in wireless communications in accordance with one or more aspects of the present disclosure.

FIG. 11 illustrates a diagram of a system 1100 including a device 1105 that supports model update techniques in wireless communications in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting model update techniques in wireless communications). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving signaling indicating a model configuration for at least a first machine learning model used to determine, for a first set of UE operational conditions, one or more parameters for wireless communications at the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The communications manager 1120 may be configured as or otherwise support a means for measuring one or more metrics associated with the set of performance indicators responsive to a detection of one or more UE operational conditions associated with the first condition ID. The communications manager 1120 may be configured as or otherwise support a means for transmitting a model evaluation report that includes the first condition ID and the one or more metrics associated with the set of performance indicators.

By including or configuring the communications manager 1120 in accordance with examples as described herein, the device 1105 may support techniques for machine learning model generalization through configuration of model evaluations for UE operational conditions, which may improve the operation of machine learning models, effectively improving the resulting machine learning models. Such machine learning models may reduce processing overhead, enhance communications throughput and reliability, and enhance overall user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of model update techniques in wireless communications as described herein, or the processor 1140 and the memory 1130 may be otherwise configured to perform or support such operations.

Figure 12:
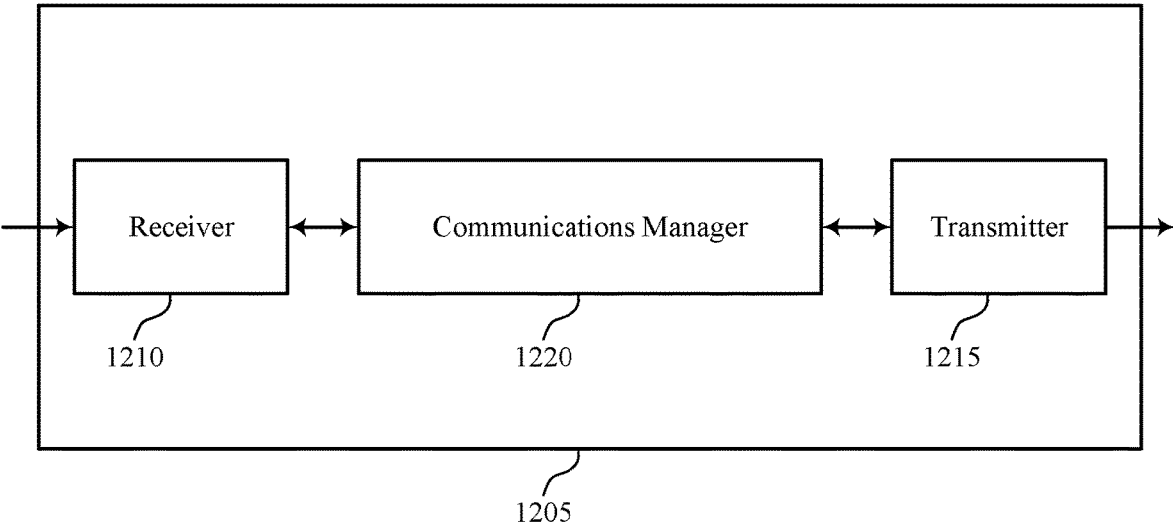
FIGS. 12 and 13 illustrate block diagrams of devices that support model update techniques in wireless communications in accordance with one or more aspects of the present disclosure.

FIG. 12 illustrates a block diagram 1200 of a device 1205 that supports model update techniques in wireless communications in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of model update techniques in wireless communications as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver

1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 may be configured as or otherwise support a means for transmitting, to a UE, signaling indicating a model configuration for at least a first machine learning model used to determine, for a first set of UE operational conditions, one or more parameters for wireless communications with the UE for a first set of UE operational conditions. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The communications manager 1220 may be configured as or otherwise support a means for receiving, from the UE, a model evaluation report that includes the first condition ID and one or more metrics associated with a set of performance indicators measured at the UE responsive to a detection of one or more UE operational conditions associated with the first condition ID.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for machine learning model generalization through configuration of model evaluations for UE operational conditions, which may improve the operation of machine learning models, effectively improving the resulting machine learning models. Such machine learning models may reduce processing overhead, enhance communications throughput and reliability, and enhance overall user experience.

Figure 13:
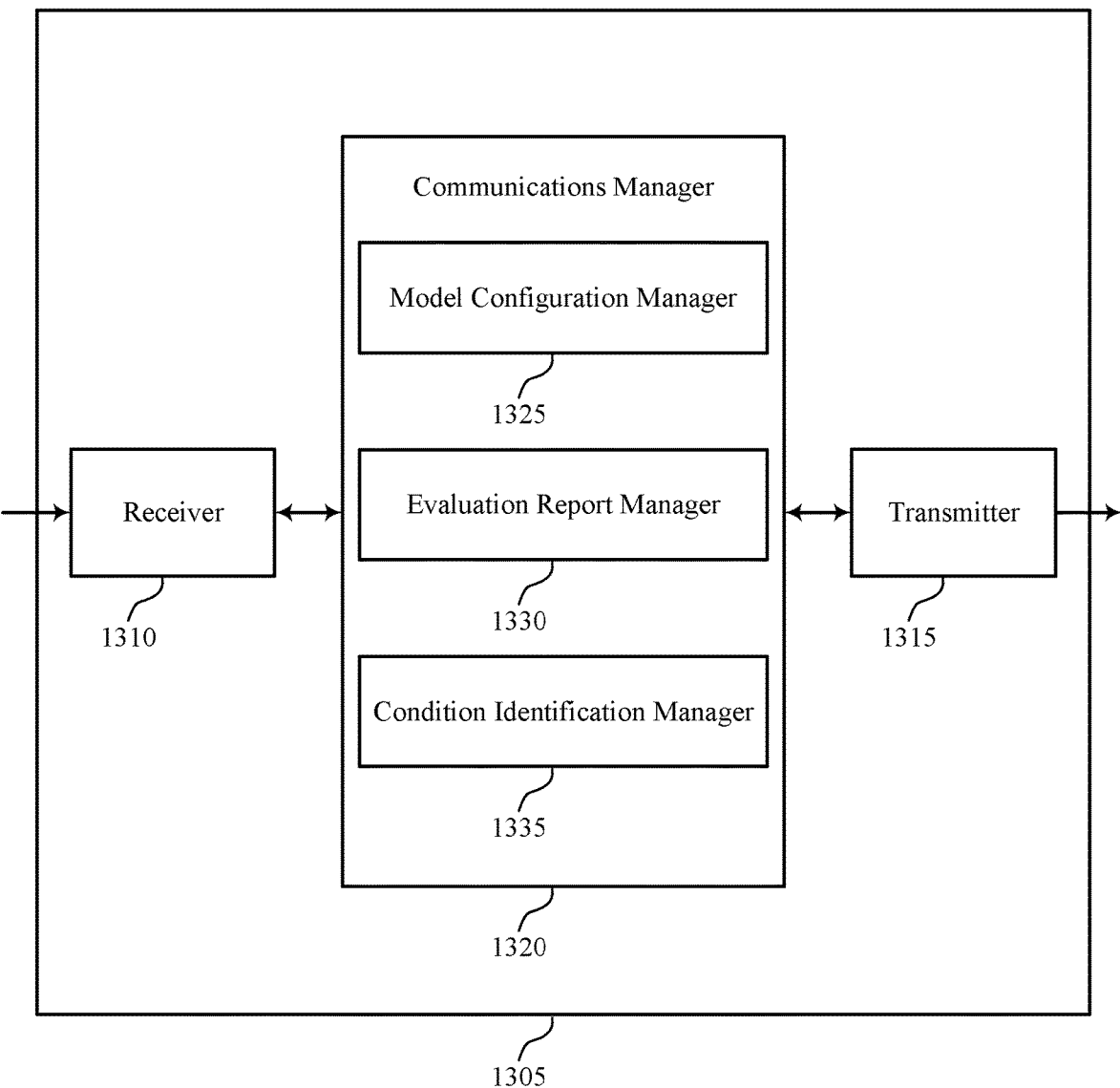

FIG. 13 illustrates a block diagram 1300 of a device 1305 that supports model update techniques in wireless communications in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of model update techniques in wireless communications as described herein. For example, the communications manager 1320 may include a model configuration manager 1325, an evaluation report manager 1330, a condition identification manager 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The model configuration manager 1325 may be configured as or otherwise support a means for transmitting, to a UE, signaling indicating a model configuration for at least a first machine learning model used to determine, for a first set of UE operational conditions, one or more parameters for wireless communications with the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions. A condition associated with the first condition ID may be identified by the condition identification manager 1335. The evaluation report manager 1330 may be configured as or otherwise support a means for receiving, from the UE, a model evaluation report that includes the first condition ID and one or more metrics associated with a set of performance indicators measured at the UE responsive to a detection of one or more UE operational conditions associated with the first condition ID.

Figure 14:
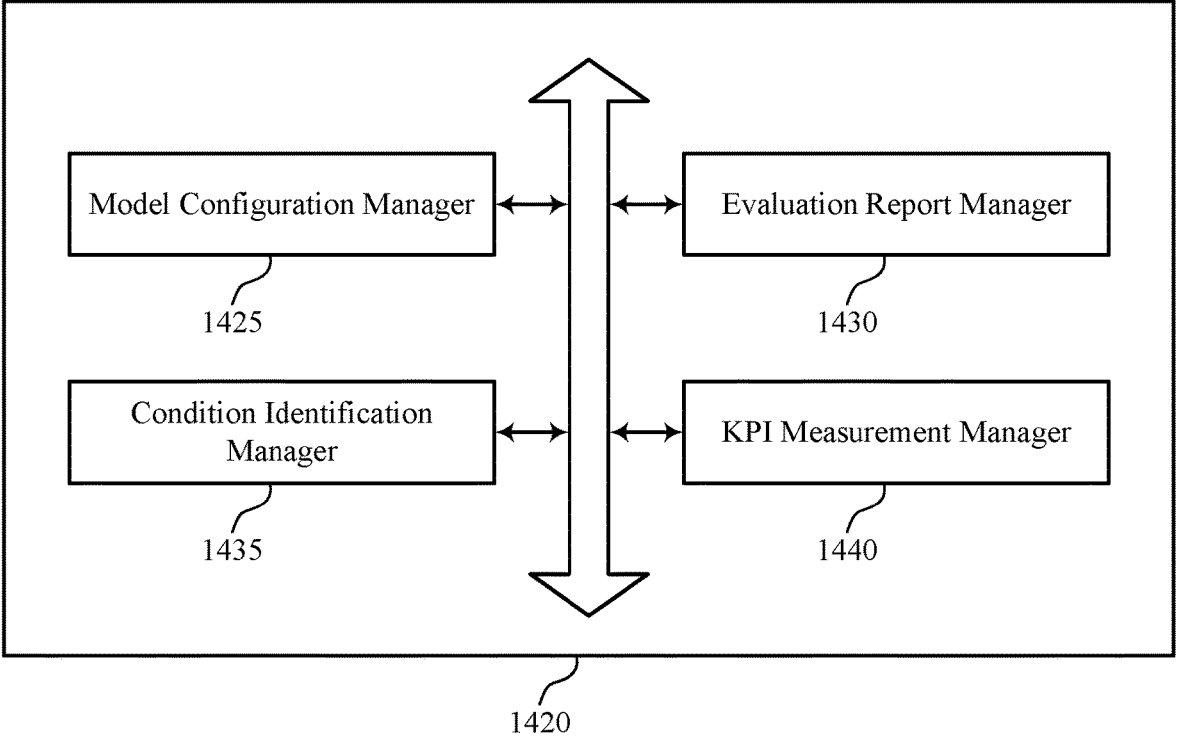
FIG. 14 illustrates a block diagram of a communications manager that supports model update techniques in wireless communications in accordance with one or more aspects of the present disclosure.
Figure 14:

FIG. 14 illustrates a block diagram 1400 of a communications manager 1420 that supports model update techniques in wireless communications in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of model update techniques in wireless communications as described herein. For example, the communications manager 1420 may include a model configuration manager 1425, an evaluation report manager 1430, a condition identification manager 1435, a KPI measurement manager 1440, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The model configuration manager 1425 may be configured as or otherwise support a means for transmitting, to a UE, signaling indicating a model configuration for at least a first machine learning model used to determine, for a first set of UE operational conditions, one or more parameters for wireless communications with the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, where the second set of UE operational conditions include at least a first condition ID that corresponds to one or more of a scenario, configuration, or setting of the UE that is outside of the first set of UE operational conditions. The evaluation report manager 1430 may be configured as or otherwise support a means for receiving, from the UE, a model evaluation report that includes the first condition ID and one or more metrics associated with a set of performance indicators measured at the UE responsive to a detection of one or more UE operational conditions associated with the first condition ID.

In some examples, to support transmitting the model configuration, the model configuration manager 1425 may be configured as or otherwise support a means for transmitting configuration information for a set of multiple models, where each model of the set of multiple models has one or more corresponding sets of performance indicators and one or more corresponding sets of UE operational conditions for transmitting the model evaluation report. In some examples, the evaluation report manager 1430 may be configured as or otherwise support a means for receiving one or more additional model evaluation reports for at least a second machine learning model of the set of multiple models.

In some examples, the condition identification manager 1435 may be configured as or otherwise support a means for configuring the UE to determine that the one or more conditions associated with the first condition ID are present at the UE based on one or more measurements of one or more reference signals at the UE, a hardware configuration of the UE, one or more settings of the UE, or any combinations thereof. In some examples, the condition identification manager 1435 may be configured as or otherwise support a means for receiving an indication of the first condition ID from the UE that indicates that the one or more conditions associated with the first condition ID are present at the UE. In some examples, the KPI measurement manager 1440 may be configured as or otherwise support a means for transmitting, to the UE responsive to receiving the indication of the first condition ID, a trigger that indicates a first set of metrics associated with the first condition ID are to be measured.

In some examples, the model configuration manager 1425 may be configured as or otherwise support a means for determining one or more parameters for wireless communications based on second condition of the first set of UE operational conditions and the first machine learning model. In some examples, the model configuration manager 1425 may be configured as or otherwise support a means for communicating with the UE based on the one or more parameters.

In some examples, the KPI measurement manager 1440 may be configured as or otherwise support a means for transmitting, to the UE, an indication of a change associated with the first condition ID. In some examples, the UE transmits the model evaluation report responsive to the indication of the change associated with the first condition ID.

In some examples, the condition identification manager 1435 may be configured as or otherwise support a means for receiving, from the UE, a request for one or more condition IDs to be measured at the UE. In some examples, the model configuration is transmitted responsive to the request. In some examples, the request indicates one or more of a start time or a stop time for one or more associated condition IDs. In some examples, the model evaluation report includes one or more model IDs, one or more condition IDs associated with each of the one or more model IDs, and one or more metrics associated with the set of performance indicators of each reported condition ID.

In some examples, the evaluation report manager 1430 may be configured as or otherwise support a means for receiving a set of multiple model evaluation reports from a set of multiple UEs. In some examples, the evaluation report manager 1430 may be configured as or otherwise support a means for determining an updated model configuration for the first machine learning model based on the set of multiple model evaluation reports. In some examples, the model configuration manager 1425 may be configured as or otherwise support a means for transmitting the updated model configuration to the set of multiple UEs. In some examples, the updated model configuration for the first machine learning model provides an updated first set of UE operational conditions. In some examples, the model configuration manager 1425 may be configured as or otherwise support a means for determining one or more parameters for wireless communications using the updated model configuration when one or more of the scenario, configuration, or setting of the UE corresponds to the first condition ID.

Figure 15:
FIG. 15 illustrates a diagram of a system including a device that supports model update techniques in wireless communications in accordance with one or more aspects of the present disclosure.

FIG. 15 illustrates a diagram of a system 1500 including a device 1505 that supports model update techniques in wireless communications in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting model update techniques in wireless communications). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 may be configured as or otherwise support a means for transmitting, to a UE, signaling indicating a model configuration for at least a first machine learning model used to determine, for a first set of UE operational conditions, one or more parameters for wireless communications with the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The communications manager 1520 may be configured as or otherwise support a means for receiving, from the UE, a model evaluation report that includes the first condition ID and one or more metrics associated with a set of performance indicators measured at the UE responsive to a detection of one or more UE operational conditions associated with the first condition ID.

By including or configuring the communications manager 1520 in accordance with examples as described herein, the device 1505 may support techniques for machine learning model generalization through configuration of model evaluations for UE operational conditions, which may improve the operation of machine learning models, effectively improving the resulting machine learning models. Such machine learning models may reduce processing overhead, enhance communications throughput and reliability, and enhance overall user experience.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of model update techniques in wireless communications as described herein, or the processor 1535 and the memory 1525 may be otherwise configured to perform or support such operations.

FIG. 16 illustrates a flowchart illustrating a method 1600 that supports model update techniques in wireless communications in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving signaling indicating a model configuration for at least a first machine learning model used to determine, for a first set of UE operational conditions, one or more parameters for wireless communications at the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The operations of 1605 may be performed in accordance with examples as disclosed herein. In some examples, aspects of the operations of 1605 may be performed by a model configuration manager 1025 as described with reference to FIG. 10.

At 1610, the method may include measuring one or more metrics associated with the set of performance indicators responsive to a detection of one or more UE operational conditions associated with the first condition ID. The operations of 1610 may be performed in accordance with examples as disclosed herein. In some examples, aspects of the operations of 1610 may be performed by a KPI measurement manager 1030 as described with reference to FIG. 10.

At 1615, the method may include transmitting a model evaluation report that includes the first condition ID and the one or more metrics associated with the set of performance indicators. The operations of 1615 may be performed in accordance with examples as disclosed herein. In some examples, aspects of the operations of 1615 may be performed by an evaluation report manager 1035 as described with reference to FIG. 10.

Optionally, at 1620, the method may include receiving an updated model configuration for the first machine learning model. In some examples, the updated model configuration is based on the model evaluation report and one or more other model evaluation reports provided by one or more other UEs and where the updated model configuration for the first machine learning model provides an updated first set of UE operational conditions. The operations of 1620 may be performed in accordance with examples as disclosed herein. In some examples, aspects of the operations of 1620 may be performed by a model configuration manager 1025 as described with reference to FIG. 10.

Optionally, at 1625, the method may include determining one or more parameters for wireless communications using the updated model configuration when one or more of the scenario, configuration, or setting of the UE corresponds to the first condition ID. The operations of 1625 may be performed in accordance with examples as disclosed herein. In some examples, aspects of the operations of 1625 may be performed by a model configuration manager 1025 as described with reference to FIG. 10.

FIG. 17 illustrates a flowchart illustrating a method 1700 that supports model update techniques in wireless communications in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving signaling indicating a model configuration for at least a first machine learning model used to determine, for a first set of conditions, one or more parameters for wireless communications at the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The operations of 1705 may be performed in accordance with examples as disclosed herein. In some examples, aspects of the operations of 1705 may be performed by a model configuration manager 1025 as described with reference to FIG. 10.

At 1710, the method may include receiving configuration information for a set of multiple models, where each model of the set of multiple models has one or more corresponding sets of performance indicators and one or more corresponding sets of UE operational conditions for transmitting the model evaluation report for the evaluation of model applicability or generalization outside of an associated initial set of conditions for each model of the set of multiple models. The operations of 1710 may be performed in accordance with examples as disclosed herein. In some examples, aspects of the operations of 1710 may be performed by a model configuration manager 1025 as described with reference to FIG. 10.

At 1715, the method may include measuring one or more metrics associated with the set of performance indicators responsive to a detection of one or more UE operational conditions associated with the first condition ID. The operations of 1715 may be performed in accordance with examples as disclosed herein. In some examples, aspects of the operations of 1715 may be performed by a KPI measurement manager 1030 as described with reference to FIG. 10.

At 1720, the method may include transmitting a model evaluation report that includes the first condition ID and the one or more metrics associated with the set of performance indicators. The operations of 1720 may be performed in accordance with examples as disclosed herein. In some examples, aspects of the operations of 1720 may be performed by an evaluation report manager 1035 as described with reference to FIG. 10.

FIG. 18 illustrates a flowchart illustrating a method 1800 that supports model update techniques in wireless communications in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving signaling indicating a model configuration for at least a first machine learning model used to determine, for a first set of conditions, one or more parameters for wireless communications at the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The operations of 1805 may be performed in accordance with examples as disclosed herein. In some examples, aspects of the operations of 1805 may be performed by a model configuration manager 1025 as described with reference to FIG. 10.

At 1810, the method may include determining that the one or more UE operational conditions associated with the first condition ID are present at the UE based on one or more measurements of one or more reference signals at the UE, a hardware configuration of the UE, one or more settings of the UE, or any combinations thereof. In some examples, the measuring includes measuring a first set of metrics associated with the first condition ID. The operations of 1810 may be performed in accordance with examples as disclosed herein. In some examples, aspects of the operations of 1810 may be performed by a condition identification manager 1040 as described with reference to FIG. 10.

At 1815, the method may include transmitting an indication of the first condition ID to a network entity that indicates the one or more UE operational conditions associated with the first condition ID are present at the UE. The operations of 1815 may be performed in accordance with examples as disclosed herein. In some examples, aspects of the operations of 1815 may be performed by a condition identification manager 1040 as described with reference to FIG. 10.

At 1820, the method may include receiving, from the network entity, a trigger that indicates the first set of metrics associated with the first condition ID are to be measured. The operations of 1820 may be performed in accordance with examples as disclosed herein. In some examples, aspects of the operations of 1820 may be performed by a KPI measurement manager 1030 as described with reference to FIG. 10.

At 1825, the method may include measuring one or more metrics associated with the set of performance indicators responsive to a detection of one or more UE operational conditions associated with the first condition ID. The operations of 1825 may be performed in accordance with examples as disclosed herein. In some examples, aspects of the operations of 1825 may be performed by a KPI measurement manager 1030 as described with reference to FIG. 10.

At 1830, the method may include transmitting a model evaluation report that includes the first condition ID and the one or more metrics associated with the set of performance indicators. The operations of 1830 may be performed in accordance with examples as disclosed herein. In some examples, aspects of the operations of 1830 may be performed by an evaluation report manager 1035 as described with reference to FIG. 10.

FIG. 19 illustrates a flowchart illustrating a method 1900 that supports model update techniques in wireless communications in accordance with one or more aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving signaling indicating a model configuration for at least a first machine learning model used to determine, for a first set of conditions, one or more parameters for wireless communications at the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The operations of 1905 may be performed in accordance with examples as disclosed herein. In some examples, aspects of the operations of 1905 may be performed by a model configuration manager 1025 as described with reference to FIG. 10.

At 1910, the method may include receiving an indication of a change associated with the first condition ID. In some examples, the measuring and the transmitting are performed responsive to the indication of the change associated with the first condition ID. The operations of 1910 may be performed in accordance with examples as disclosed herein. In some examples, aspects of the operations of 1910 may be performed by a KPI measurement manager 1030 as described with reference to FIG. 10.

At 1915, the method may include measuring one or more metrics associated with the set of performance indicators responsive to a detection of one or more UE operational conditions associated with the first condition ID. The operations of 1915 may be performed in accordance with examples as disclosed herein. In some examples, aspects of the operations of 1915 may be performed by a KPI measurement manager 1030 as described with reference to FIG. 10.

At 1920, the method may include transmitting a model evaluation report that includes the first condition ID and the one or more metrics associated with the set of performance indicators. The operations of 1920 may be performed in accordance with examples as disclosed herein. In some examples, aspects of the operations of 1920 may be performed by an evaluation report manager 1035 as described with reference to FIG. 10.

FIG. 20 illustrates a flowchart illustrating a method 2000 that supports model update techniques in wireless communications in accordance with one or more aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2005, the method may include receiving signaling indicating a model configuration for at least a first machine learning model used to determine, for a first set of conditions, one or more parameters for wireless communications at the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The operations of 2005 may be performed in accordance with examples as disclosed herein. In some examples, aspects of the operations of 2005 may be performed by a model configuration manager 1025 as described with reference to FIG. 10.

At 2010, the method may include transmitting, to a network entity, a request for one or more condition IDs to be measured at the UE. In some examples, the receiving the model configuration is responsive to the request. The operations of 2010 may be performed in accordance with examples as disclosed herein. In some examples, aspects of the operations of 2010 may be performed by a condition identification manager 1040 as described with reference to FIG. 10.

At 2015, the method may include measuring one or more metrics associated with the set of performance indicators responsive to a detection of one or more UE operational conditions associated with the first condition ID. The operations of 2015 may be performed in accordance with examples as disclosed herein. In some examples, aspects of the operations of 2015 may be performed by a KPI measurement manager 1030 as described with reference to FIG. 10.

At 2020, the method may include transmitting a model evaluation report that includes the first condition ID and the one or more metrics associated with the set of performance indicators. The operations of 2020 may be performed in accordance with examples as disclosed herein. In some examples, aspects of the operations of 2020 may be performed by an evaluation report manager 1035 as described with reference to FIG. 10.

FIG. 21 illustrates a flowchart illustrating a method 2100 that supports model update techniques in wireless communications in accordance with one or more aspects of the present disclosure. The operations of the method 2100 may be implemented by a network entity or its components as described herein. For example, the operations of the method 2100 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2105, the method may include transmitting, to a UE, signaling indicating a model configuration for at least a first machine learning model used to determine, for a first set of conditions, one or more parameters for wireless communications with the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The operations of 2105 may be performed in accordance with examples as disclosed herein. In some examples, aspects of the operations of 2105 may be performed by a model configuration manager 1425 as described with reference to FIG. 14.

At 2110, the method may include receiving, from the UE, a model evaluation report that includes the first condition ID and one or more metrics associated with a set of performance indicators measured at the UE responsive to a detection of one or more UE operational conditions associated with the first condition ID. The operations of 2110 may be performed in accordance with examples as disclosed herein. In some examples, aspects of the operations of 2110 may be performed by an evaluation report manager 1430 as described with reference to FIG. 14.

At 2115, the method may include receiving a set of multiple model evaluation reports from a set of multiple UEs. The operations of 2115 may be performed in accordance with examples as disclosed herein. In some examples, aspects of the operations of 2115 may be performed by an evaluation report manager 1430 as described with reference to FIG. 14.

At 2120, the method may include determining an updated model configuration for the first machine learning model based on the set of multiple model evaluation reports. The operations of 2120 may be performed in accordance with examples as disclosed herein. In some examples, aspects of the operations of 2120 may be performed by an evaluation report manager 1430 as described with reference to FIG. 14.

At 2125, the method may include transmitting the updated model configuration to the set of multiple UEs. In some examples, the updated model configuration for the first machine learning model provides an updated first set of UE operational conditions. The operations of 2125 may be performed in accordance with examples as disclosed herein. In some examples, aspects of the operations of 2125 may be performed by a model configuration manager 1425 as described with reference to FIG. 14.

At 2130, the method may include determining one or more parameters for wireless communications using the updated model configuration when one or more of the scenario, configuration, or setting of the UE corresponds to the first condition ID. The operations of 2130 may be performed in accordance with examples as disclosed herein. In some examples, aspects of the operations of 2130 may be performed by a model configuration manager 1425 as described with reference to FIG. 14.

FIG. 22 illustrates a flowchart illustrating a method 2200 that supports model update techniques in wireless communications in accordance with one or more aspects of the present disclosure. The operations of the method 2200 may be implemented by a network entity or its components as described herein. For example, the operations of the method 2200 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2205, the method may include transmitting, to a UE, signaling indicating a model configuration for at least a first machine learning model used to determine, for a first set of conditions, one or more parameters for wireless communications with the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The operations of 2205 may be performed in accordance with examples as disclosed herein. In some examples, aspects of the operations of 2205 may be performed by a model configuration manager 1425 as described with reference to FIG. 14.

At 2210, the method may include transmitting configuration information for a set of multiple models, where each model of the set of multiple models has one or more corresponding sets of performance indicators and one or more corresponding sets of UE operational conditions for transmitting the model evaluation report. The operations of 2210 may be performed in accordance with examples as disclosed herein. In some examples, aspects of the operations of 2210 may be performed by a model configuration manager 1425 as described with reference to FIG. 14.

At 2215, the method may include receiving, from the UE, a model evaluation report that includes the first condition ID and one or more metrics associated with a set of performance indicators measured at the UE responsive to a detection of one or more UE operational conditions associated with the first condition ID. The operations of 2215 may be performed in accordance with examples as disclosed herein. In some examples, aspects of the operations of 2215 may be performed by an evaluation report manager 1430 as described with reference to FIG. 14.

At 2220, the method may include receiving one or more additional model evaluation reports for at least a second machine learning model of the set of multiple models. The operations of 2220 may be performed in accordance with examples as disclosed herein. In some examples, aspects of the operations of 2220 may be performed by an evaluation report manager 1430 as described with reference to FIG. 14.

FIG. 23 illustrates a flowchart illustrating a method 2300 that supports model update techniques in wireless communications in accordance with one or more aspects of the present disclosure. The operations of the method 2300 may be implemented by a network entity or its components as described herein. For example, the operations of the method 2300 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2305, the method may include transmitting, to a UE, signaling indicating a model configuration for at least a first machine learning model used to determine, for a first set of conditions, one or more parameters for wireless communications with the UE. In some examples, the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, and where the second set of UE operational conditions include at least a first condition ID that corresponds to one or more of a scenario, configuration, or setting of the UE that is outside of the first set of UE operational conditions. The operations of 2305 may be performed in accordance with examples as disclosed herein. In some examples, aspects of the operations of 2305 may be performed by a model configuration manager 1425 as described with reference to FIG. 14.

At 2310, the method may include configuring the UE to determine that the one or more conditions associated with the first condition ID are present at the UE based on one or more measurements of one or more reference signals at the UE, a hardware configuration of the UE, one or more settings of the UE, or any combinations thereof. The operations of 2310 may be performed in accordance with examples as disclosed herein. In some examples, aspects of the operations of 2310 may be performed by a condition identification manager 1435 as described with reference to FIG. 14.

At 2315, the method may include receiving an indication of the first condition ID from the UE that indicates that the one or more conditions associated with the first condition ID are present at the UE. The operations of 2315 may be performed in accordance with examples as disclosed herein. In some examples, aspects of the operations of 2315 may be performed by a condition identification manager 1435 as described with reference to FIG. 14.

At 2320, the method may include transmitting, to the UE responsive to receiving the indication of the first condition ID, a trigger that indicates a first set of metrics associated with the first condition ID are to be measured. The operations of 2320 may be performed in accordance with examples as disclosed herein. In some examples, aspects of the operations of 2320 may be performed by a KPI measurement manager 1440 as described with reference to FIG. 14.

At 2325, the method may include receiving, from the UE, a model evaluation report that includes the first condition ID and one or more metrics associated with a set of performance indicators measured at the UE responsive to a detection of one or more UE operational conditions associated with the first condition ID. The operations of 2325 may be performed in accordance with examples as disclosed herein. In some examples, aspects of the operations of 2325 may be performed by an evaluation report manager 1430 as described with reference to FIG. 14.

The following provides an overview of aspects of the present disclosure:

Aspect 1: A method for wireless communication by a UE, comprising: receiving signaling indicating a model configuration for at least a first machine learning model used to determine, for a first set of UE operational conditions, one or more parameters for wireless communications at the UE, wherein the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, wherein the second set of UE operational conditions include at least a first condition ID that corresponds to one or more of a scenario, configuration, or setting of the UE that is outside of the first set of UE operational conditions; measuring one or more metrics associated with the set of performance indicators responsive to a detection of one or more UE operational conditions associated with the first condition ID; and transmitting a model evaluation report that includes the first condition ID and the one or more metrics associated with the set of performance indicators.

Aspect 2: The method of aspect 1, wherein the receiving the model configuration comprises: receiving configuration information for a plurality of models, wherein each model of the plurality of models has one or more corresponding sets of performance indicators and one or more corresponding sets of UE operational conditions for transmitting the model evaluation report for the evaluation of model applicability or generalization outside of an associated initial set of conditions for each model of the plurality of models.

Aspect 3: The method of aspect 2, further comprising: transmitting one or more additional model evaluation reports for at least a second machine learning model of the plurality of models.

Aspect 4: The method of any of aspects 1 through 3, further comprising: determining that the one or more UE operational conditions associated with the first condition ID are present at the UE based at least in part on one or more measurements of one or more reference signals at the UE, a hardware configuration of the UE, one or more settings of the UE, or any combinations thereof, wherein the measuring comprises measuring a first set of metrics associated with the first condition ID.

Aspect 5: The method of aspect 4, further comprising: transmitting an indication of the first condition ID to a network entity that indicates the one or more UE operational conditions associated with the first condition ID are present at the UE.

Aspect 6: The method of aspect 5, further comprising: receiving, from the network entity, a trigger that indicates the first set of metrics associated with the first condition ID are to be measured.

Aspect 7: The method of any of aspects 1 through 6, further comprising: determining one or more parameters for wireless communications based at least in part on second condition of the first set of UE operational conditions and the first machine learning model; and communicating with a network entity based at least in part on the one or more parameters.

Aspect 8: The method of any of aspects 1 through 7, further comprising: receiving an indication of a change associated with the first condition ID, wherein the measuring and the transmitting are performed responsive to the indication of the change associated with the first condition ID.

Aspect 9: The method of any of aspects 1 through 8, further comprising: transmitting, to a network entity, a request for one or more condition IDs to be measured at the UE, wherein the receiving the model configuration is responsive to the request.

Aspect 10: The method of aspect 9, wherein the request indicates one or more of a start time or a stop time for one or more associated condition IDs.

Aspect 11: The method of any of aspects 1 through 10, wherein the model evaluation report includes one or more model IDs, one or more condition IDs associated with each of the one or more model IDs, and one or more metrics associated with the set of performance indicators of each reported condition ID.

Aspect 12: The method of any of aspects 1 through 11, further comprising: receiving an updated model configuration for the first machine learning model, wherein the updated model configuration is based at least in part on the model evaluation report and one or more other model evaluation reports provided by one or more other UEs, wherein the updated model configuration for the first machine learning model provides an updated first set of UE operational conditions; and determining one or more parameters for wireless communications using the updated model configuration when one or more of the scenario, configuration, or setting of the UE corresponds to the first condition ID.

Aspect 13: A method for wireless communication by a network entity, comprising: transmitting, to a UE, signaling indicating a model configuration for at least a first machine learning model used to determine, for a first set of UE operational conditions, one or more parameters for wireless communications with the UE, wherein the model configuration includes a set of performance indicators associated with the first machine learning model and used to determine, for a second set of UE operational conditions that are different than the first set of UE operational conditions, whether the first machine learning model can be used for one or more conditions of the second set of UE operational conditions, wherein the second set of UE operational conditions include at least a first condition ID that corresponds to one or more of a scenario, configuration, or setting of the UE that is outside of the first set of UE operational conditions; and receiving, from the UE, a model evaluation report that includes the first condition ID and one or more metrics associated with a set of performance indicators measured at the UE responsive to a detection of one or more UE operational conditions associated with the first condition ID.

Aspect 14: The method of aspect 13, wherein the transmitting the model configuration comprises: transmitting configuration information for a plurality of models, wherein each model of the plurality of models has one or more corresponding sets of performance indicators and one or more corresponding sets of UE operational conditions for transmitting the model evaluation report.

Aspect 15: The method of aspect 14, further comprising: receiving one or more additional model evaluation reports for at least a second machine learning model of the plurality of models.

Aspect 16: The method of any of aspects 13 through 15, further comprising: configuring the UE to determine that the one or more conditions associated with the first condition ID are present at the UE based at least in part on one or more measurements of one or more reference signals at the UE, a hardware configuration of the UE, one or more settings of the UE, or any combinations thereof.

Aspect 17: The method of aspect 16, further comprising: receiving an indication of the first condition ID from the UE that indicates that the one or more conditions associated with the first condition ID are present at the UE.

Aspect 18: The method of aspect 17, further comprising: transmitting, to the UE responsive to receiving the indication of the first condition ID, a trigger that indicates a first set of metrics associated with the first condition ID are to be measured.

Aspect 19: The method of any of aspects 13 through 18, further comprising: determining one or more parameters for wireless communications based at least in part on second condition of the first set of UE operational conditions and the first machine learning model; and communicating with the UE based at least in part on the one or more parameters.

Aspect 20: The method of any of aspects 13 through 19, further comprising: transmitting, to the UE, an indication of a change associated with the first condition ID, wherein the UE transmits the model evaluation report responsive to the indication of the change associated with the first condition ID.

Aspect 21: The method of any of aspects 13 through 20, further comprising: receiving, from the UE, a request for one or more condition IDs to be measured at the UE, wherein the model configuration is transmitted responsive to the request.

Aspect 22: The method of aspect 21, wherein the request indicates one or more of a start time or a stop time for one or more associated condition IDs.

Aspect 23: The method of any of aspects 13 through 22, wherein the model evaluation report includes one or more model IDs, one or more condition IDs associated with each of the one or more model IDs, and one or more metrics associated with the set of performance indicators of each reported condition ID.

Aspect 24: The method of any of aspects 13 through 23, further comprising: receiving a plurality of model evaluation reports from a plurality of UEs; determining an updated model configuration for the first machine learning model based at least in part on the plurality of model evaluation reports; transmitting the updated model configuration to the plurality of UEs, wherein the updated model configuration for the first machine learning model provides an updated first set of UE operational conditions; and determining one or more parameters for wireless communications using the updated model configuration when one or more of the scenario, configuration, or setting of the UE corresponds to the first condition ID.

Aspect 25: A UE for wireless communication, comprising one or more memories storing processor-executable code; and one or more processors coupled with the one or more memories and individually or collectively operable to execute the code to cause the UE to perform a method of any of aspects 1 through 12.

Aspect 26: A UE for wireless communication, comprising at least one means for performing a method of any of aspects 1 through 12.

Aspect 27: A non-transitory computer-readable medium storing code for wireless communication at a UE, the code comprising instructions executable by one or more processors to perform a method of any of aspects 1 through 12.

Aspect 28: A network entity for wireless communication, one or more memories storing processor-executable code; and one or more processors coupled with the one or more memories and individually or collectively operable to execute the code to cause the network entity to perform a method of any of aspects 13 through 24.

Aspect 29: A network entity for wireless communication, comprising at least one means for performing a method of any of aspects 13 through 24.

Aspect 30: A non-transitory computer-readable medium storing code for wireless communication at a network entity, the code comprising instructions executable by one or more processors to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   one or more memories; and
   one or more processors coupled with the one or more memories and configured to cause the UE to:
      receive signaling indicating one or more configurations to determine, for a first set of UE operational conditions, one or more parameters for wireless communications at the UE,
         wherein the one or more configurations includes a set of performance indicators associated with a first machine learning model of a first configuration of the one or more configurations, the set of performance indicators used to determine whether the first machine learning model can be used to generate the one or more parameters in accordance with a machine learning inference at the UE;
      measure one or more metrics associated with the set of performance indicators responsive to a detection of one or more UE operational conditions associated with at least the first configuration;
      determine an applicability of the first configuration based on the one or more UE operational conditions; and
      transmit an applicability report that includes an indication of at least the first configuration based on the determined applicability.

2. The UE of claim 1, wherein to receive the signaling indicating one or more configurations, the one or more processors are configured to cause the UE to:
   receive configuration information for a plurality of models, wherein each model of the plurality of models has one or more corresponding sets of performance indicators and one or more corresponding sets of UE operational conditions for transmitting the applicability report with an indication of model applicability for one or more corresponding models of the plurality of models.

3. The UE of claim 2, wherein the one or more processors are configured to cause the UE to:
   transmit one or more additional applicability reports for at least a second configuration associated with a corresponding second machine learning model of the plurality of models.

4. The UE of claim 1, wherein the one or more processors are configured to cause the UE to:
   determine that the one or more UE operational conditions associated with the first configuration are present at the UE based at least in part on one or more measurements of one or more reference signals at the UE, a hardware configuration of the UE, one or more settings of the UE, or any combinations thereof, wherein to measure the one or more metrics the one or more processors are configured to cause the UE to measure a first set of metrics associated with the first configuration.

5. The UE of claim 4, wherein the one or more processors are configured to cause the UE to:

transmit an indication of the first configuration to a network entity that indicates the one or more UE operational conditions associated with the first configuration are present at the UE.

6. The UE of claim 5, wherein the one or more processors are configured to cause the UE to:

receive a trigger that indicates the first set of metrics associated with the first configuration are to be measured.

7. The UE of claim 1, wherein the one or more processors are configured to cause the UE to:

determine one or more parameters for wireless communications based at least in part on the first configuration, the one or more metrics and the first machine learning model; and communicate with a network entity based at least in part on the one or more parameters.

8. The UE of claim 1, wherein the one or more processors are configured to cause the UE to:

receive an indication of a change associated with the one or more configurations, wherein the one or more metrics are measured and the applicability report is transmitted responsive to the indication of the change associated with the one or more configurations.

9. The UE of claim 1, wherein the one or more processors are configured to cause the UE to:

transmit a request for one or more configurations for determining the one or more parameters for wireless communications at the UE, wherein to receive the one or more configuration the one or more processors are configured to cause the UE to receive the one or more configurations responsive to the request.

10. The UE of claim 9, wherein the request indicates one or more of a start time or a stop time for one or more associated configurations.

11. The UE of claim 1, wherein the applicability report includes one or more model IDs, one or more condition IDs associated with each of the one or more model IDs, and one or more metrics associated with the set of performance indicators of each reported condition ID.

12. The UE of claim 1, wherein the one or more processors are configured to cause the UE to:

receive an updated configuration for the first configuration of the one or more configurations, wherein the updated configuration is based at least in part on the applicability report, wherein the updated configuration provides an updated set of UE operational conditions; and determine one or more parameters for wireless communications using the updated configuration when one or more of a scenario, configuration, or setting of the UE corresponds to the updated configuration.

13. A network entity for wireless communication, comprising:

one or more memories; and one or more processors coupled with the one or more memories and configured to cause the network entity to:

transmit, to a user equipment (UE), signaling indicating one or more configurations to determine, for a first set of UE operational conditions, one or more parameters for wireless communications with the UE, wherein the one or more configurations includes a set of performance indicators associated with a first machine learning model of a first configuration of the one or more configurations, the set of performance indicators used to determine whether the first machine learning model can be used to generate the one or more parameters in accordance with a machine learning inference at the UE; and receive, from the UE, an applicability report that includes an indication of at least the first configuration based on a determined applicability of the first configuration responsive to a detection of one or more UE operational conditions associated with the first configuration.

14. The network entity of claim 13, wherein to transmit the signaling indicating one or more configurations, the one or more processors are configured to cause the network entity to:

transmit configuration information for a plurality of models, wherein each model of the plurality of models has one or more corresponding sets of performance indicators and one or more corresponding sets of UE operational conditions for transmitting the applicability report.

15. The network entity of claim 14, wherein the one or more processors are configured to cause the network entity to:

receive one or more additional applicability reports for at least a second configuration associated with a corresponding second machine learning model of the plurality of models.

16. The network entity of claim 13, wherein the one or more processors are configured to cause the network entity to:

configure the UE to determine that the one or more UE operational conditions associated with the first configuration are present at the UE based at least in part on one or more measurements of one or more reference signals at the UE, a hardware configuration of the UE, one or more settings of the UE, or any combinations thereof.

17. The network entity of claim 16, wherein the one or more processors are configured to cause the network entity to:

receive an indication of the first configuration from the UE that indicates that the one or more UE operational conditions associated with the first configuration are present at the UE.

18. The network entity of claim 17, wherein the one or more processors are configured to cause the network entity to:

transmit, to the UE responsive to receiving the indication of the first configuration, a trigger that indicates a first set of metrics associated with the first configuration are to be measured.

19. The network entity of claim 13, wherein the one or more processors are configured to cause the network entity to:

determine one or more parameters for wireless communications based at least in part on the first configuration, one or more metrics reported by the UE, and the first machine learning model; and communicate with the UE based at least in part on the one or more parameters.

20. The network entity of claim 13, wherein the one or more processors are configured to cause the network entity to:

transmit, to the UE, an indication of a change associated with the one or more configuration, wherein the UE transmits the applicability report responsive to the indication of the change associated with the one or more configuration.

21. The network entity of claim 13, wherein the one or more processors are configured to cause the network entity to:

receive, from the UE, a request for one or more configurations for determining the one or more parameters for wireless communications at the UE, wherein the signaling indicating one or more s is transmitted responsive to the request.

22. The network entity of claim 21, wherein the request indicates one or more of a start time or a stop time for one or more associated configurations.

23. The network entity of claim 13, wherein the applicability report includes one or more model IDs, one or more condition IDs associated with each of the one or more model IDs, and one or more metrics associated with the set of performance indicators of each reported condition ID.

24. The network entity of claim 13, wherein the one or more processors are configured to cause the network entity to:

receive a plurality of applicability reports from a plurality of UEs;

determine an updated configuration for the first configuration of the one or more configuration based at least in part on the plurality of applicability reports;

transmit the updated configuration to the plurality of UEs, wherein the updated configuration provides an updated set of UE operational conditions; and determine one or more parameters for wireless communications using the updated configuration when one or more of a scenario, configuration, or setting of the UE corresponds to the updated configuration.

25. A method for wireless communication by a user equipment (UE), comprising:

receiving signaling indicating one or more configurations to determine, for a first set of UE operational conditions, one or more parameters for wireless communications at the UE, wherein the one or more configurations includes a set of performance indicators associated with a first machine learning model of a first configuration of the one or more configurations, the set of performance indicators used to determine whether the first machine learning model can be used to generate the one or more parameters in accordance with a machine learning inference at the UE;

measuring one or more metrics associated with the set of performance indicators responsive to a detection of one or more UE operational conditions associated with at least the first configuration;

determining an applicability of the first configuration based on the one or more UE operational conditions; and transmitting an applicability report that includes an indication of at least the first configuration based on the determined applicability.

26. The method of claim 25, wherein receiving the signaling indicating the one or more configurations comprises:

receiving configuration information for a plurality of models, wherein each model of the plurality of models has one or more corresponding sets of performance indicators and one or more corresponding sets of UE operational conditions for transmitting the applicability report with an indication of model applicability for one or more corresponding models of the plurality of models.

27. The method of claim 26, further comprising:

transmitting one or more additional applicability reports for at least a second configuration associated with a corresponding second machine learning model of the plurality of models.

28. A method for wireless communication by a network entity, comprising:

transmitting, to a user equipment (UE), signaling indicating one or more configurations to determine, for a first set of UE operational conditions, one or more parameters for wireless communications with the UE, wherein the one or more configurations includes a set of performance indicators associated with a first machine learning model of a first configuration of the one or more configurations, the set of performance indicators used to determine, whether the first machine learning model can be used to generate the one or more parameters in accordance with a machine learning inference at the UE; and receiving, from the UE, an applicability report that includes an indication of at least the first configuration based on a determined applicability of the first configuration responsive to a detection of one or more UE operational conditions associated with the first configuration.

29. The method of claim 28, wherein transmitting the signaling comprises:

transmitting configuration information for a plurality of models, wherein each model of the plurality of models has one or more corresponding sets of performance indicators and one or more corresponding sets of UE operational conditions for transmitting the applicability report.

30. The method of claim 29, further comprising:

receiving one or more additional applicability reports for at least a second configuration associated with a corresponding second machine learning model of the plurality of models.

* * * * *